(12) United States Patent
Russell-Clarke et al.

(10) Patent No.: US 11,200,385 B2
(45) Date of Patent: Dec. 14, 2021

(54) ELECTRONIC CARD HAVING AN ELECTRONIC INTERFACE

(71) Applicant: Apple Inc., Cupertino, CA (US)

(72) Inventors: Peter N. Russell-Clarke, San Francisco, CA (US); Rafael L. Dionello, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/526,814

(22) Filed: Jul. 30, 2019

(65) Prior Publication Data

US 2020/0104549 A1 Apr. 2, 2020

Related U.S. Application Data

(60) Provisional application No. 62/737,528, filed on Sep. 27, 2018, provisional application No. 62/814,779, filed on Mar. 6, 2019, provisional application No. 62/814,788, filed on Mar. 6, 2019.

(51) Int. Cl.
*G06K 7/00* (2006.01)
*G06K 19/077* (2006.01)
*H01F 10/06* (2006.01)

(52) U.S. Cl.
CPC ..... *G06K 7/0056* (2013.01); *G06K 19/07743* (2013.01); *H01F 10/06* (2013.01); *G06K 19/07732* (2013.01)

(58) Field of Classification Search
CPC .................................................. G06K 7/0056
USPC ........................................................ 235/380
See application file for complete search history.

(56) References Cited

U.S. PATENT DOCUMENTS

| 296,631 | A | 4/1884 | Schuetz |
| 1,608,108 | A | 11/1926 | Martus et al. |
| 2,473,848 | A | 8/1947 | Baxter |
| 2,821,589 | A | 1/1958 | Needham |
| 3,123,792 | A | 3/1964 | Klemm |
| 3,471,663 | A | 10/1969 | Farrell |
| 3,499,281 | A | 3/1970 | Denley |

(Continued)

FOREIGN PATENT DOCUMENTS

| CH | 689338 | 2/1999 |
| CH | 714005 | 1/2019 |

(Continued)

OTHER PUBLICATIONS

Jaeger, "Color Solid Ink Printing," imaging.org, 4 pages, at least as early as Sep. 23, 2014.

*Primary Examiner* — Rafferty D Kelly
(74) *Attorney, Agent, or Firm* — Brownstein Hyatt Farber Schreck, LLP

(57) ABSTRACT

This disclosure is directed to an electronic identification card or electronic card having various features. The electronic card may include an integrated circuit and a contact plate for electrically interfacing with the integrated circuit. The contact plate may include an array of terminal electrodes that are offset with respect to the edges of the contact plate. The electronic card may be coated with a coating layer that extends at least partially over a ferromagnetic element or film. The electronic card may also include a metal substrate having exposed chamfer portions that may provide a visual contrast to the coating layer and also improve the handling and use of the electronic card.

20 Claims, 29 Drawing Sheets

(56) References Cited

U.S. PATENT DOCUMENTS

| | | | |
|---|---|---|---|
| 3,535,869 A | 10/1970 | Strigini | |
| 3,846,697 A | 11/1974 | Giger | |
| 3,982,917 A | 9/1976 | Upton | |
| 4,227,059 A | 10/1980 | Ogawa | |
| 4,340,791 A | 7/1982 | Sorenson | |
| 4,598,035 A | 7/1986 | Usami et al. | |
| 4,849,618 A * | 7/1989 | Namikawa | G06K 19/08 235/493 |
| 4,861,620 A | 8/1989 | Azuma et al. | |
| 5,180,051 A | 1/1993 | Cook et al. | |
| 5,206,496 A | 4/1993 | Clement et al. | |
| 5,214,530 A | 5/1993 | Coombs et al. | |
| 5,215,864 A | 6/1993 | Laakmann | |
| 5,327,201 A | 7/1994 | Coleman et al. | |
| 5,496,977 A | 3/1996 | Date et al. | |
| 5,523,125 A | 4/1996 | Kennedy et al. | |
| 5,607,607 A | 3/1997 | Naiman et al. | |
| 5,718,326 A | 2/1998 | Larose et al. | |
| 5,761,111 A | 6/1998 | Glezer et al. | |
| 5,936,213 A | 8/1999 | Bisquez et al. | |
| 6,040,543 A | 3/2000 | Mina et al. | |
| 6,084,190 A | 7/2000 | Kenmochi | |
| 6,126,309 A | 10/2000 | Bettelini et al. | |
| 6,196,738 B1 | 3/2001 | Shimizu et al. | |
| 6,201,196 B1 | 3/2001 | Wergen | |
| 6,392,683 B1 | 5/2002 | Hayashi | |
| 6,565,770 B1 | 5/2003 | Mayer et al. | |
| 6,591,457 B1 | 7/2003 | Howie, Jr. | |
| 6,630,635 B1 | 10/2003 | Doepner | |
| 6,667,450 B2 | 12/2003 | Bulin et al. | |
| 6,670,571 B2 | 12/2003 | Dance | |
| 6,707,358 B1 | 3/2004 | Massman | |
| 6,734,389 B2 | 5/2004 | Troitski | |
| 6,744,458 B2 | 6/2004 | Yamada et al. | |
| 6,762,381 B2 | 7/2004 | Kunthady et al. | |
| 7,060,933 B2 | 6/2006 | Burrowes et al. | |
| 7,101,603 B2 | 9/2006 | Okamura et al. | |
| 7,165,846 B2 | 1/2007 | Shinya | |
| 7,297,221 B2 | 11/2007 | Hikita | |
| 7,414,213 B2 | 8/2008 | Hwang et al. | |
| 7,531,765 B2 | 5/2009 | Komagata | |
| 7,727,618 B2 | 6/2010 | Iwano | |
| 8,003,200 B2 | 8/2011 | Nashiki et al. | |
| 8,173,253 B2 | 5/2012 | Green et al. | |
| 8,198,626 B2 | 6/2012 | Lee et al. | |
| 8,222,773 B2 | 7/2012 | De Iuliis et al. | |
| 8,232,502 B2 | 7/2012 | Young et al. | |
| 8,451,873 B2 | 5/2013 | Zhang | |
| 8,529,775 B2 | 9/2013 | Costin et al. | |
| 8,640,413 B2 | 2/2014 | Ruggie et al. | |
| 8,802,220 B2 | 8/2014 | Cao et al. | |
| 8,859,920 B2 | 10/2014 | Manullang et al. | |
| 8,859,923 B2 | 10/2014 | Obata et al. | |
| 8,867,320 B2 | 10/2014 | Suzuki et al. | |
| 8,882,280 B2 | 11/2014 | Fukaya et al. | |
| 8,974,924 B2 | 3/2015 | Weber et al. | |
| 9,335,868 B2 | 5/2016 | Hotelling et al. | |
| 9,346,124 B2 | 5/2016 | Kato et al. | |
| 9,600,694 B1 | 3/2017 | Memering et al. | |
| 9,629,271 B1 | 4/2017 | Lancaster-Larocque et al. | |
| 9,678,258 B2 | 6/2017 | Hankey et al. | |
| 9,727,178 B2 | 8/2017 | Matsuyuki et al. | |
| 9,790,126 B2 | 10/2017 | Matsuyuki et al. | |
| 9,836,684 B2 | 12/2017 | Finn et al. | |
| 9,844,898 B2 | 12/2017 | Hill et al. | |
| 9,916,048 B2 | 3/2018 | Ishibashi et al. | |
| 10,099,506 B2 | 10/2018 | Walker et al. | |
| 2005/0287301 A1 | 12/2005 | Ljubomirsky | |
| 2006/0024476 A1 | 2/2006 | Leland et al. | |
| 2007/0054067 A1 | 3/2007 | Power | |
| 2007/0276504 A1 | 11/2007 | Sparer et al. | |
| 2008/0042427 A1 | 2/2008 | Muke | |
| 2008/0299408 A1 | 12/2008 | Guo et al. | |
| 2008/0304525 A1 | 12/2008 | Kupisiewicz et al. | |
| 2009/0166343 A1 | 7/2009 | Lappalainen et al. | |
| 2009/0237782 A1 | 9/2009 | Takamatsu et al. | |
| 2010/0055022 A1 | 3/2010 | Linares et al. | |
| 2010/0119808 A1 | 5/2010 | Li et al. | |
| 2011/0109590 A1 | 5/2011 | Park et al. | |
| 2012/0052275 A1 | 3/2012 | Hashimoto et al. | |
| 2012/0328905 A1 | 12/2012 | Guo et al. | |
| 2013/0075126 A1 | 3/2013 | Nashner et al. | |
| 2013/0112536 A1 | 5/2013 | Shah et al. | |
| 2013/0140746 A1 | 6/2013 | Heverly et al. | |
| 2014/0363608 A1 | 12/2014 | Lancaster-Larocque et al. | |
| 2016/0180212 A1* | 6/2016 | Herslow | G06K 19/07773 235/492 |
| 2017/0001906 A1 | 1/2017 | Karagoz et al. | |
| 2017/0008798 A1 | 1/2017 | Mimoun et al. | |
| 2019/0039352 A1 | 2/2019 | Zhao et al. | |
| 2019/0262948 A1 | 8/2019 | Russell-Clarke et al. | |
| 2020/0104550 A1 | 4/2020 | Russell-Clarke et al. | |
| 2020/0361817 A1 | 11/2020 | Li et al. | |

FOREIGN PATENT DOCUMENTS

| | | |
|---|---|---|
| CN | 1213439 | 4/1999 |
| CN | 1755489 | 4/2006 |
| CN | 1929723 | 3/2007 |
| CN | 101075503 | 11/2007 |
| CN | 101479049 | 7/2009 |
| CN | 101665969 | 3/2010 |
| CN | 101665971 | 3/2010 |
| CN | 101729624 | 6/2010 |
| CN | 101777110 | 7/2010 |
| CN | 101927627 | 12/2010 |
| CN | 102102465 | 6/2011 |
| CN | 201904983 | 7/2011 |
| CN | 201945987 | 8/2011 |
| CN | 201956238 | 8/2011 |
| CN | 202120044 | 1/2012 |
| CN | 102725663 | 10/2012 |
| CN | 102752982 | 10/2012 |
| CN | 202632259 | 12/2012 |
| CN | 102869492 | 1/2013 |
| CN | 202649955 | 1/2013 |
| CN | 102958640 | 3/2013 |
| CN | 202854790 | 4/2013 |
| CN | 103112308 | 5/2013 |
| CN | 103415370 | 11/2013 |
| CN | 103422162 | 12/2013 |
| CN | 203366304 | 12/2013 |
| CN | 103902122 | 7/2014 |
| CN | 104166870 | 11/2014 |
| CN | 204242152 | 4/2015 |
| CN | 105324248 | 2/2016 |
| CN | 107784350 | 3/2018 |
| DE | 102010006665 | 8/2011 |
| EP | 348580 | 1/1990 |
| EP | 0424173 | 4/1991 |
| EP | 1805040 | 7/2007 |
| EP | 2721698 | 4/2014 |
| EP | 3330897 | 6/2018 |
| FR | 2975617 | 11/2012 |
| GB | 581824 | 10/1946 |
| GB | 957644 | 5/1964 |
| GB | 2552406 | 1/2018 |
| JP | H0491875 | 3/1992 |
| JP | H0593811 | 4/1993 |
| JP | 05307088 | 11/1993 |
| JP | H07164787 | 6/1995 |
| JP | 2002137579 | 5/2002 |
| JP | 2009274342 | 11/2009 |
| JP | 201263839 | 3/2012 |
| JP | 201410814 | 1/2014 |
| JP | 201768416 | 4/2017 |
| KR | 20070046983 | 3/2007 |
| KR | 1020090131944 | 4/2010 |
| KR | 20180020704 | 2/2018 |
| TW | 504647 | 1/2002 |
| TW | 200419720 | 10/2004 |
| TW | I309386 | 5/2009 |
| TW | M414616 | 10/2011 |
| TW | 201231792 | 8/2012 |

(56) References Cited

FOREIGN PATENT DOCUMENTS

| WO | WO01/15916 | 3/2001 |
| WO | WO01/34408 | 5/2001 |
| WO | WO2011/076294 | 6/2011 |
| WO | WO2013/135703 | 9/2013 |
| WO | WO2014/080157 | 5/2014 |
| WO | WO2015/128188 | 9/2015 |
| WO | WO2015/139929 | 9/2015 |
| WO | WO2017/112507 | 6/2017 |

* cited by examiner

ELECTRONIC CARD HAVING AN ELECTRONIC INTERFACE

CROSS-REFERENCE TO RELATED APPLICATION(S)

This application is a nonprovisional patent application of and claims the benefit of U.S. Provisional Patent Application No. 62/737,528, filed Sep. 27, 2018 and titled "Electronic Card Having an Electronic Interface," U.S. Provisional Patent Application No. 62/814,779, filed Mar. 6, 2019 and titled "Electronic Card Having an Electronic Interface," and U.S. Provisional Patent Application No. 62/814,788, filed Mar. 6, 2019 and titled "Electronic Card Having an Electronic Interface," the disclosures of which are hereby incorporated herein by reference in their entireties.

FIELD

The described embodiments relate generally to electronic devices. More particularly, the present embodiments relate to an electronic card having an electronic interface and various features, as described herein.

BACKGROUND

Traditionally, identification cards have been used to identify a particular user or entity associated with the card. For example, identification cards may include a printed serial number, a photograph, or other information that can be used to identify a user. However, recent developments in user identification allow for electronic readers to identify a user by electronically reading an identification card or other form of ID. The cards, systems, and techniques described herein are directed to electronic cards having improved features and processes for manufacturing electronic cards.

SUMMARY

Embodiments described herein are directed to an electronic identification card or an electronic card having various features. The electronic card may include an integrated circuit and a contact plate for electrically interfacing with the integrated circuit. The contact plate may include an array of terminal electrodes that are offset with respect to the edges of the contact plate. The electronic card may be coated with a coating layer that extends at least partially over a ferromagnetic element or film. The electronic card may also include a metal substrate having exposed chamfer portions that may provide a visual contrast to the coating layer and also improve the handling and use of the electronic card.

In some example embodiments, the electronic identification card includes a substrate comprising a metal material. The substrate may define a first recess or stepped region formed into a first surface of the substrate and extending along an outer substrate edge of the substrate. The substrate may also define a second recess formed into a second surface of the substrate, the second surface opposite to the first surface. A ferromagnetic film may be disposed at least partially within the first recess or stepped region and an integrated circuit may be disposed at least partially within the second recess. The identification card also includes a coating layer comprising a polymer and a pigment dispersed within the polymer. The coating layer may be disposed over the ferromagnetic film and at least a portion of the substrate.

In some embodiments, the substrate is formed from a titanium sheet having a thickness that is less than 1 mm. The substrate may include a titanium sheet that is bonded or laminated to a plastic (polymer) sheet and the combined thickness of the titanium sheet and the plastic sheet is less than 1 mm. In some cases, the first recess is a first laser-ablated recess formed into the first surface of the substrate. The second recess may be a second laser-ablated recess formed into the second surface of the substrate. In some implementations, the electronic identification card has a rectangular shape with four corners, each corner having a contoured shape. The contoured shape is a spline shape having a non-uniform radius of curvature.

In some embodiments, the coating layer comprises a first layer and a second layer. The first layer comprises the polymer and the pigment, and the second layer comprises a transparent polymer that is disposed over the first layer and defines at least a portion of an external surface of the electronic identification card. In some cases, the coating layer is disposed over the first surface and at least a portion of the second surface of the substrate.

In some embodiments, the electronic identification card also includes a contact plate positioned over the integrated circuit. The portion of the external surface defined by the transparent polymer may be a first portion, and the contact plate may define an array of terminal electrodes that define a second portion of the external surface of the electronic identification card.

In some embodiments, the electronic identification card defines a first set of chamfered edges that extends around the first surface, and a second set of chamfered edges that extends around the second surface. In some cases, a first chamfered edge of the first set of chamfered edges extends along the outer substrate edge of the substrate. The ferromagnetic film may be attached to a backing layer and the first chamfered edge may be defined, at least in part, by a beveled edge formed within the ferromagnetic film and the backing layer. In some implementations, the first chamfered edge does not extend beyond the beveled edge of the ferromagnetic film and the backing layer.

In some embodiments, the second set of chamfered edges is defined, at least in part, by a chamfer portion of the substrate. The electronic identification card may also include an oxide coating formed over the chamfer portion of the substrate. The coating layer may have a first color and the oxide coating may have a second color that is visually distinct from the first color.

In some embodiments, the electronic identification card further comprises a laser-formed relief feature. The laser-formed relief feature may include at least one recess wall defining a recess extending through the coating layer. The laser-formed relief feature may also include a recessed marking feature defining a bottom of the recess and visually distinct from an adjacent portion of the coating layer.

Some example embodiments are directed to an electronic identification card including a substrate defining a recess formed into a front surface and an integrated circuit positioned in the recess. The electronic card may also include a ferromagnetic film positioned along a rear surface of the substrate that is opposite to the front surface. The electronic card may also include a contact plate positioned over the integrated circuit and may include: a plate substrate defining a set of outer edges, and an array of terminal electrodes disposed over the plate substrate. Each terminal electrode of the array of terminal electrodes may have a respective offset from the set of outer edges of the plate substrate.

In some implementations, the contact plate further comprises a set of ablated regions, each ablated region positioned between a respective terminal electrode of the array of terminal electrodes and a respective outer edge of the set of outer edges. In some cases, the contact plate also includes a conductive periphery portion that includes a conductive material that surrounds the array of terminal electrodes. The periphery portion may be separated from the array of terminal electrodes by one or more ablated regions.

In some implementations, the array of terminal electrodes may be disposed over a front surface of the plate substrate. The contact plate may also include a rear conductive layer disposed over a rear surface of the plate substrate. The array of terminal electrodes may be electrically coupled to the rear conductive layer by one or more vias that extend through the plate substrate.

In some embodiments, the plate substrate is formed from a non-conductive material. The array of terminal electrodes may include a first conductive layer including an electroless plated metal disposed over the non-conductive material of the plate substrate. The array of terminal electrodes may also include a second conductive layer including an electroplated metal disposed over the first conductive layer.

Some example embodiments are directed to a method of forming a contact plate for an electronic card. A photoresist layer may be applied to a front surface of a plate substrate. The photoresist layer may be exposed using a light source to form a plating mask defining an array of plating areas. A catalytic solution may be applied to the array of plating areas to form a first conductive layer along a plating area of the array of plating areas. A plating solution may be applied to the first conductive layer. While the plating solution is applied to the first conductive layer, a second conductive layer may be formed over the first conductive layer using an electroplating process that passes a current through the first conductive layer to define a terminal electrode having an offset between the terminal electrode and an edge of the plate substrate.

In some embodiments, the plate substrate is formed from a non-conductive material. The first conductive layer may include a bridge portion that electrically couples the first conductive layer to the edge of the plate substrate. In some cases, the method further comprises laser-ablating a portion of the first and second conductive layers that is located at least partially within the bridge portion to expose a portion of the non-conductive material of the plate substrate. In some embodiments, a conductive periphery portion is positioned over the front surface of the plate substrate and at least partially surrounds the terminal electrode. The bridge portion may extend between the terminal electrode and the conductive periphery portion.

In some embodiments, a rear conductive layer is formed along a rear surface of the plate substrate, the rear surface being opposite to the front surface. The first conductive layer may be electrically coupled to the rear conductive layer using one or more vias that extend through the plate substrate.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
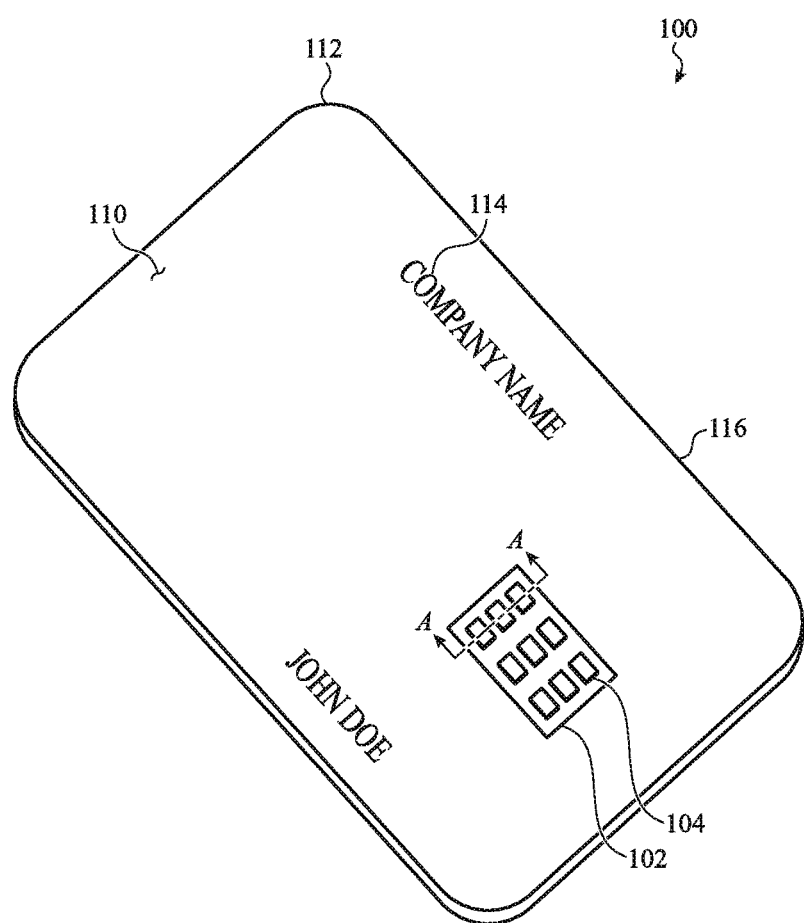
FIG. 1A depicts a front of an example electronic card.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to an electronic card having various features. As described herein, the electronic card includes an integrated circuit and an electronic interface that can be used to communicate with an external card reader. The electronic card may be an identification card used to authenticate or identify the user. In some examples, the electronic card is used as a security badge, employee identification card, student identification card, customer loyalty card, electronic passport, or some other form of electronic identification. In some instances, the electronic card may be a state-issued identification card that serves as a driver's license, social security card, or other government-issued ID. The electronic card may also be used to facilitate a transaction or purchase and may, in some instances, be used as a credit card, debit card, prepaid debit card, prepaid telephone card, vending card, parking card, toll card, and other similar types of card used to facilitate a transaction. In some cases, the electronic card is configured to securely store information and/or a key or code that can be used to access securely stored information from another source. For example, the electronic card may be used to store or access medical records or financial information. In some cases, the electronic card is configured to operate as a subscriber identity module (SIM) for use with a mobile or cellular telephone. The electronic card may also be configured as a gift card that is configured to store a card value or debit an account having the card value. The electronic card may also be used to provide access to a facility, restricted area, or restricted system. For example, the electronic card may include one or more components that are configured to communicate with an external reader or device in order to unlock access to a restricted area, region, or system.

The electronic card, also referred to herein as an electronic identification card, smart card, chip card, or integrated circuit card (ICC), typically includes an integrated circuit, an electrical interface, and may also include one or magnetized elements like a ferromagnetic strip or magnetic region. The electronic card may also comply with one or more standards including, for example, ISO 14443, ISO 15693, ISO 7810, and/or ISO 7816 international standards. In some instances, the electronic card may conform with standards and industry norms related to what are referred to as "contact cards." Contact cards typically include an array of terminals or electrodes that make physical contact with an external card reader or other electronic device to facilitate electronic communication. The electronic card may also conform with standards and practices that may be related to what are referred to as "contactless cards." In general, contactless cards include a wireless transceiver or other wireless electronics that are configured to interface with an external device using a wireless communication protocol. In some cases, contactless cards do include one or more electrical contacts or terminals in addition to the wireless electronics and, in other cases, the contactless cards do not include any electrical contacts or terminals. Whether the electronic card is a contact card or a contactless card, the electronic card may also include a magnetic or ferromagnetic strip for use with an external card reader having a magnetic swipe or similar magnetic strip reading functionality.

Some embodiments described herein are directed to an electronic card having a metal substrate that is coated with a two-part coating or multi-layer coating. The coating layer (made up of one or more individual layers or parts) may be specially formulated to give the electronic card the appearance and/or tactile feel of a ceramic material. For example, the coating layer may have a particular formulation of additives and a surface roughness that provides a ceramic-like tactile feel to the touch. The coating layer may also be used to give the electronic card a uniform appearance and may conceal different functional elements of the card. For example, the coating layer may be used to conceal a ferromagnetic film, ferromagnetic strip, or ferromagnetic stack that is positioned below the coating. In some instances, the ferromagnetic film, ferromagnetic strip, or ferromagnetic stack is positioned in a stepped region, recess, or pocket formed into the electronic card and then covered or coated by the coating layer.

Some embodiments described herein are directed to an electronic card having a contact plate with a unique arrangement of electrodes. In particular, the electronic card may have a contact plate with an array of terminal electrodes that are offset from the edges of the contact plate. As described herein, the contact plate may have an array of terminal electrodes where each terminal electrode is offset with respect to a respective edge of the contact plate. This configuration provides certain functional benefits by allowing a unique terminal layout that may not be possible using traditional techniques. However, this configuration may also present various manufacturing challenges. Various techniques for solving these manufacturing challenges are described herein. For example, in some examples, the terminal electrodes may temporarily extend to one or more edges of the contact plate in order to facilitate an electroplating process and then portions of the terminal electrodes are ablated away using a laser-based process. In other examples, the terminal electrodes are electrically coupled to a copper layer that is positioned on a hidden or inner surface of the contact plate, which may be used to facilitate an electroplating process.

Some embodiments described herein are directed to an electronic card having a marking that is formed at least partially into the coating layer. In some embodiments, the marking includes a subsurface marking that is formed below a first layer of a coating layer and into a second layer of a coating layer. In some embodiments, the marking includes a laser-relief feature that extends through the coating layer and exposes a portion of the underlying substrate. In examples where the substrate is formed from a metal material, the laser relief feature may include one or more oxide layers that may provide a color or distinct visual appearance as compared to surrounding or adjacent portions of the coating layer.

In some examples, the electronic card includes one or more chamfers or beveled edges formed around the front or rear surface of the electronic card. In some implementations, the chamfers or beveled edges are located entirely within a ferromagnetic film and support layer and do not extend into an underlying metal substrate. In some cases, the chamfers or beveled edges extend into the metal substrate to expose a portion of the metal material. In these cases, the exposed portion of the metal material may be coated with an oxide layer that provides a different color, distinct color, or particular visual appearance. In some cases, the chamfers include a coating or oxide layer that provides a colored appearance and an edge of the card presents an exposed edge of the metal substrata that remains uncoated or uncovered by a coating or colored oxide layer. Using these techniques allow for a distinctive visual appearance that is not as vulnerable to wear or degradation over time as compared to a traditional ink or printed marking.

These and other embodiments are discussed below with reference to FIGS. 1A-17. However, those skilled in the art will readily appreciate that the detailed description given herein with respect to these Figures is for explanatory purposes only and should not be construed as limiting.

Figure 1B:
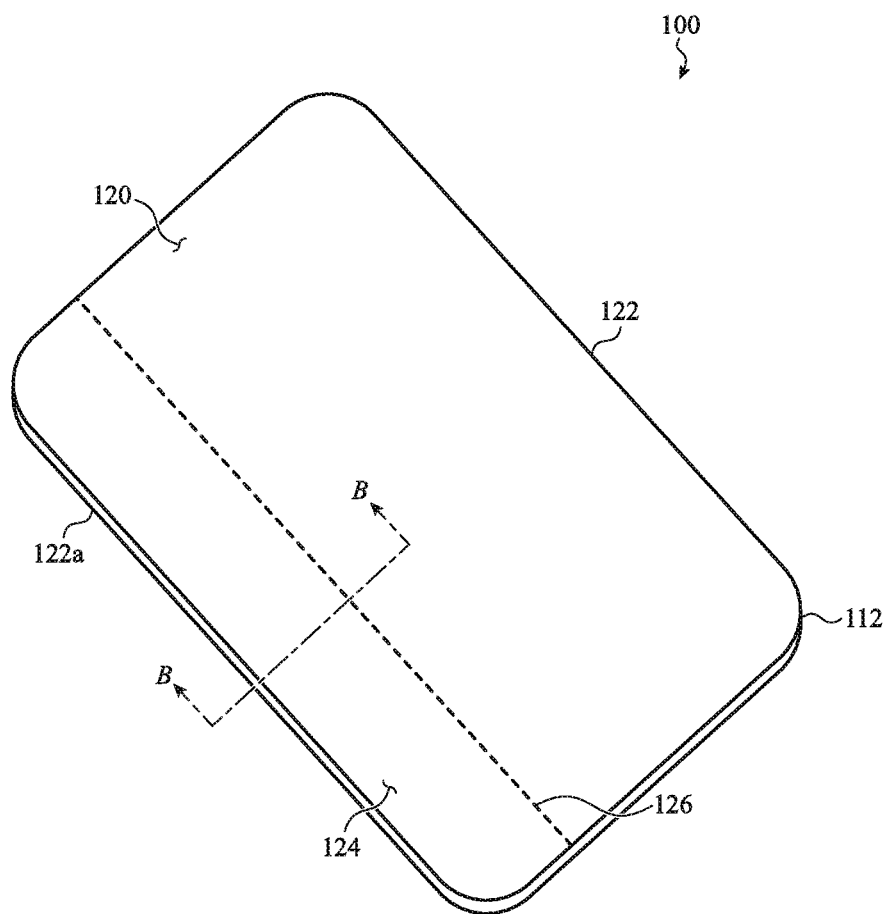
FIG. 1B depicts a rear of an example electronic card.

FIGS. 1A and 1B depict an example electronic card in accordance with the embodiments described herein. FIG. 1A depicts a front of the electronic card 100. In general, the electronic card 100 may be an electronic identification card that is associated with a specific individual. The electronic card 100 may be used to authenticate or identify the individual or user. As suggested previously, the electronic card 100 may be used as a security badge, employee identification card, student identification card, customer or retail loyalty card, electronic passport, or some other form of electronic identification. The electronic card may also be used to facilitate a transaction or purchase and may, in some instances, be used as a credit card, debit card, prepaid debit card, prepaid telephone card, vending card, parking card, toll card, and other similar types of card used to facilitate a transaction. The electronic card 100 may comply with one or more standards including, for example, ISO 14443, ISO 15693, ISO 7810, and/or ISO 7816 international standards.

In some cases, the electronic card 100 includes computer memory that is configured to securely store information and/or a key or code that can be used to access information that is stored on an external device or system. For example, the electronic card 100 may be used to store or access medical records or financial information. In some cases, the electronic card 100 is configured to operate as a subscriber identity module (SIM) for use with a mobile or cellular telephone on a wireless or cellular network. The computer memory or computer-readable memory functionality of the electronic card 100 may be provided by one or more memory components including, for example, electronically readable magnetic strip or magnetic strap, programmable random access memory, solid state memory components, and other forms of electronic information storage components. Other example computer-readable memory components are described below with respect to FIG. 17.

The electronic card 100 may also be referred to as an electronic identification card, smart card, chip card, or integrated circuit card (ICC). The electronic card 100 depicted in FIG. 1A is configured to operate as a contact card. In some implementations, the electronic card 100 may include wireless circuitry and may be configured to operate as a contactless card. If configured as a contactless card, the electronic card 100 may still include the contact plate 102 or, alternatively, may omit the contact plate 102.

As shown in FIG. 1A, the electronic card 100 includes several features along the front surface 110. In particular, the electronic card 100 includes a contact plate 102, which includes an array of terminal electrodes 104 that define at least a portion of the external surface of the electronic card 100. The terminal electrodes 104 may be formed from a conductive material and may be configured to provide a contact-based electrical interface with an external device including, for example, an external card reader, terminal device, point of service (POS) system, or other similar type of device. As shown in FIG. 1A, the array of terminal electrodes 104 may be offset from the edges of the contact plate 102 and may have any one of a variety of shapes or configurations. Example contact plates and terminal electrodes are described below with respect to FIGS. 6A-9B.

In general, the terminal electrodes 104 of the contact plate 102 remain exposed to facilitate electrical contact with an external card reader or device. However, the terminal electrodes 104 may include a conductive coating or otherwise be colored to substantially match the color of a surrounding portion of the electronic card 100. In one example, the terminal electrodes 104 are coated with a conductive ink or marking that substantially matches a color of the coating of the electronic card 100 in order to camouflage or hide the exposed terminal electrodes 104. While the contact plate 102 is depicted as having a square or rectangular form factor, in other embodiments, the contact plate 102 may have a circular or rounded profile or form factor. In some instances, the contact plate 102 and terminal electrodes 104, formed using one of the manufacturing techniques described, may be thinner than a traditional contact plate assembly or circuit.

As shown in FIG. 1A, the electronic card 100 may also include one or more markings 114. The markings 114 may identify a company, institution, or entity associated with the electronic card 100. The markings 114 may, optionally, identify the user or individual associated with the card. In some instances, the markings 114 may include an account number, serial number, or some other identifier associated with the individual and/or the electronic card 100. In embodiments in which the electronic card 100 is a credit card or other similar card issued by a financial institution, the electronic card 100 may omit the traditional signature block, expiration date, primary account number (PAN), or other more traditional markings. The markings 114 may include a name and/or logo of the issuing entity and the card-holder's name or other unique personalization associated with the card holder. Also, unlike some traditional credit cards, the markings 114 may be flush, not embossed, or otherwise smooth along the exterior surface of the electronic card 100.

In some cases, the markings 114 include a micro-scale security mark. The micro-scale security mark may include micro-scale features that are etched, laser formed, machined, or otherwise formed into a coating of the electronic card 100. The micro-scale features may produce an authenticating mark that is difficult to counterfeit or copy and may be used to verify the authenticity of the electronic card 100. In some cases, the micro-scale security mark may be integrated into one or more non-micro-scale markings in order to camouflage or otherwise obscure the appearance of the micro-scale markings.

In some implementations, the markings 114 are printed or painted on the front surface 110 of the electronic card 100. Additionally or alternatively, the markings 114 may be formed using a laser marking technique. In one example, the marking 114 is a subsurface marking formed into one of the coating layers of the electronic card 100. In another example, the markings 114 may include a laser-formed relief feature that is formed into a coating or coating layer of the electronic card 100 and may extend into an underlying card substrate. (See, e.g., substrate 1202, 1302, and 1402 of FIGS. 12, 13, and 14, respectively.) Using a laser-formed relief feature as the marking 114 or as part of the marking 114 may provide a striking visual feature that is more durable than a traditional ink or printed marking. A variety of example markings are described below with respect to FIGS. 10-15B.

As shown in FIG. 1A, the electronic card 100 may include a set of edges 116 that surround the front surface 110. In accordance with some embodiments described herein, one or more edges of the set of edges 116 may include a chamfer or beveled region. In some embodiments, as described herein, the set of edges 116 is a set of chamfered edges that extends around or surrounds the front surface 110. The chamfer or bevel may enhance the look and feel of the electronic card 100. The chamfer or bevel may also facilitate use of the electronic card 100 with respect to certain external card readers or card-reading devices.

FIG. 1B depicts a rear of the electronic card 100. As shown in FIG. 1B, the electronic card 100 includes several features along the rear surface 120. In particular, the electronic card 100 includes a set of edges 122 that extends around or surrounds the rear surface 120. In accordance with some embodiments described herein, one or more edges of the set of edges 122 may include a chamfer or beveled region. The chamfer or bevel may correspond to the chamfer or beveled region of the set of edges 116 that surrounds the front surface 110. In particular, a second set of chamfered edges may extend around or surround the rear surface 120. As described herein, the chamfered edges may be coated or covered with an oxide or other coating that provides a color along the chamfered edges. In some cases, the chamfered edges include exposed portions of the metal substrate. In some cases, the chamfered edges are colored and an edge or sidewall of the substrate that extends between the front and rear chamfered edges is exposed and remains uncoated or uncolored.

As shown in FIG. 1B, the electronic card 100 also includes a magnetic region 124. The magnetic region 124 may extend all the way to the edge 122a of the electronic card 100. In some embodiments, the magnetic region 124 is larger than a traditional magnetic strip used on a traditional credit card. The magnetic region 124 may allow encoded information to be read using an external card reader or card-reading device. While the entire magnetic region 124 may be encodable, in some implementations, only a portion of the magnetic region 124 is actually encoded with information. For example, a sub-region within the magnetic region 124 may define an encoded strip or band that corresponds to the location of a traditional magnetic strip on a traditional credit card, identification card, or other card that is adapted to be read using an external magnetic reader. In one example, the encoded region of the magnetic region 124 is approximately 5-10 mm wide and offset from the edge 122a by approximately 5 mm.

While the magnetic region 124 in FIG. 1B is depicted as extending all the way to the edge 122 of the electronic card 100, in other embodiments, the magnetic region 124 may be offset from one or more of the edges of the electronic card 100. Additionally, the orientation of the magnetic region 124 may vary in alternative embodiments. For example, the magnetic region 124 may be located along or offset with respect to a short edge of the electronic card 100. In one alternative embodiment, the magnetic region 124 is located within a central region of the electronic card 100. In another alternative embodiment, the magnetic region 124 is omitted entirely.

As described below with respect to FIGS. 3A-3C, the magnetic region 124 may be defined by a ferromagnetic film that is positioned below a coating layer. The coating layer may be thick enough to conceal the ferromagnetic film while being thin enough to allow for the passage of magnetized signals or encoded data. While the ferromagnetic film or another ferromagnetic element may be hidden or concealed by a coating layer, the electronic card 100 may include a visual marking 126 or other indicia to indicate the approximate location of the ferromagnetic element or film and/or indicate a boundary or region of the magnetic region 124. The visual marking 126 may be formed using an ink or printing technique and/or may include a recessed marking feature, similar to as described below with respect to FIGS. 10-15B.

As shown in FIGS. 1A and 1B, the electronic card 100 may include four corner regions 112. In this example the corner regions 112 have a contoured shape. In some implementations, the corner regions 112 have a non-uniform radius of curvature. Specifically, the corner regions 112 may have a shape that corresponds to a splined or variable radius contour. Corner regions having a variable or non-uniform radius of curvature may be generally referred to as having a spline shape. In some implementations, the corner regions 112 have a constant or uniform radius of curvature. In general, the corner regions 112 include a respective edge (of the set of edges 116, 122), which may be tangent to an adjacent edge along the respective surface. In some embodiments, the respective edge of each of the corner regions 112 has a bevel or chamfer, which may match the bevel or chamfer of the remaining edges that surround the respective surface (110, 120).

Figure 1C:
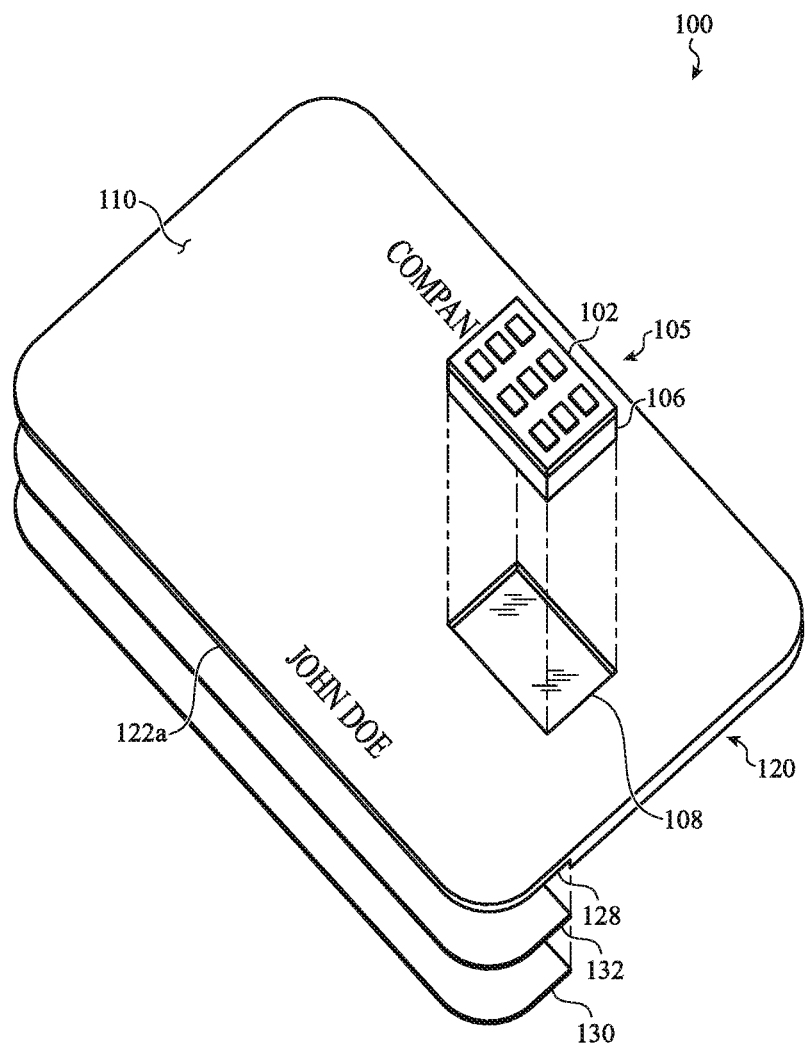
FIG. 1C depicts an exploded view of an example electronic card.

FIG. 1C depicts an exploded view of an example electronic card 100. The electronic card 100 may be formed from a metal substrate or other substrate material. In one example embodiment, the substrate is formed from a titanium or stainless steel material and the electronic card 100 has a thickness that is less than a traditional credit card. Specifically, the thickness of the electronic card 100 may be less than 0.75 mm. In addition, the flatness of the electronic card 100 may have a particularly high degree of flatness. For example, the electronic card 100 may have a flatness that varies less than 50 um across the area of the electronic card 100. In another example, the electronic card 100 may have a flatness that varies less than 20 um across the area of the electronic card 100. In another example, the electronic card 100 may have a flatness that varies less than 10 um across the area of the electronic card 100.

As shown in FIG. 1C, the electronic card 100 includes a recess 108 formed into the front surface 110 of the electronic card 100. An integrated circuit 106 is positioned at least partially within the recess 108 and the contact plate 102 is positioned over the integrated circuit 106. While the recess 108 is depicted as being approximately square or rectangular in shape, in alternative embodiments, the recess 108 may be circular or have a rounded shape or profile that is configured to receive a circular or rounded contact plate 102.

In some implementations, the integrated circuit 108 and the contact plate 102 are coupled (e.g., bonded) together to define a chip module 105. The chip module 105 may be approximately 1 cm square. In alternative embodiments, the chip module 105 may have a different shape including a circular, oval, or rounded shape or profile. The area of the chip module 105 may be determined primarily by the area of the contact plate 102 which, in this case, are the same. The integrated circuit 106 may include one or more processors, microprocessors, computer processing units (CPUs), numeric processing units (NPUs), or other processing circuitry. The integrated circuit 106 may also include one or more types of computer memory including, for example, random-access memory (RAM), read-only memory (ROM), erasable programmable read-only memory (EPROM), or other types of non-transitory computer storage. In some implementations, the integrated circuit 106 also includes wireless circuitry that is configured to transmit and/or receive wireless communications or signals.

As shown in FIG. 1C, the electronic card 100 may also include a stepped region 128 formed into the rear surface 120 of the electronic card 100. In the present example, the stepped region 128 extends all of the way to the edge 122a of the electronic card 100. However, in other embodiments, the stepped region 128 may be offset inward from the edge 122a or another edge of the electronic card 100. In some instances, the stepped region 128 is defined by two parallel walls that extend along the length (or width) of the electronic card 100. As shown in FIG. 1C, the stepped region 128 is defined by a single wall that extends along the length of the electronic card 100.

As shown in FIG. 1C, a ferromagnetic stack, including a ferromagnetic element 130 (e.g., a ferromagnetic film) and a backing layer 132, is positioned at least partially within the stepped region 128. The stepped region 128 may also be referred to as a recess or pocket and may be a laser-ablated region formed using a laser-ablating or laser-machining process. The stepped region 128 may also be formed using a mechanical machining or grinding process that removes a portion of the substrate using a mechanical cutter or grinder. As shown in FIG. 1C, the stepped region 128 includes a stepped surface that is recessed, relieved, or otherwise offset from an adjacent surface of the substrate or card.

As shown in FIG. 1C, the ferromagnetic stack, including the ferromagnetic element 130 and the backing layer 132, extends all the way to the edge 122a of the electronic card 100. The stepped region 128 may have a depth that corresponds or is approximately equal to the thickness of the ferromagnetic stack. Specifically, the stepped region 128 may have a depth that corresponds or is approximately equal to the thickness of the ferromagnetic element 130 and the backing layer 132, combined. This allows for a flush or substantially smooth surface along the rear surface 120 of the electronic card 100. For purposes of this description, substantially smooth may be used to refer to a surface over which a transition, edge, or joint between two elements is not tactilely perceptible. In accordance with some embodiments, some or all of the ferromagnetic element 130 may be covered or coated with a coating layer, which may hide or conceal the ferromagnetic element 130.

In some cases, an exterior surface of the ferromagnetic stack is textured to provide a tactile or visual effect. For example, the ferromagnetic element 130 and the backing layer 132 may be pressed or formed in order to produce a texture along an exterior surface of the card. The texture may have a surface roughness that ranges between 0.3 to 1.0 um Ra. In some cases, the ferromagnetic stack has a combined thickness that is thinner than traditional magnetic strips. In some cases, the ferromagnetic stack has a thickness that ranges between approximately 200 um and 270 um. In some cases, the ferromagnetic stack has a thickness that ranges between approximately 225 um and 250 um.

In the example depicted in FIG. 1C, the ferromagnetic element 130 and backing layer 132 are positioned within a recess or stepped region 128. However, in other embodiments, the ferromagnetic element 130 may be positioned along an outer surface of the electronic card and a coating layer or another layer may be positioned adjacent to the ferromagnetic element 130 to define a substantially smooth transition, edge, or joint between the layer and the ferromagnetic element 130.

Figure 2:
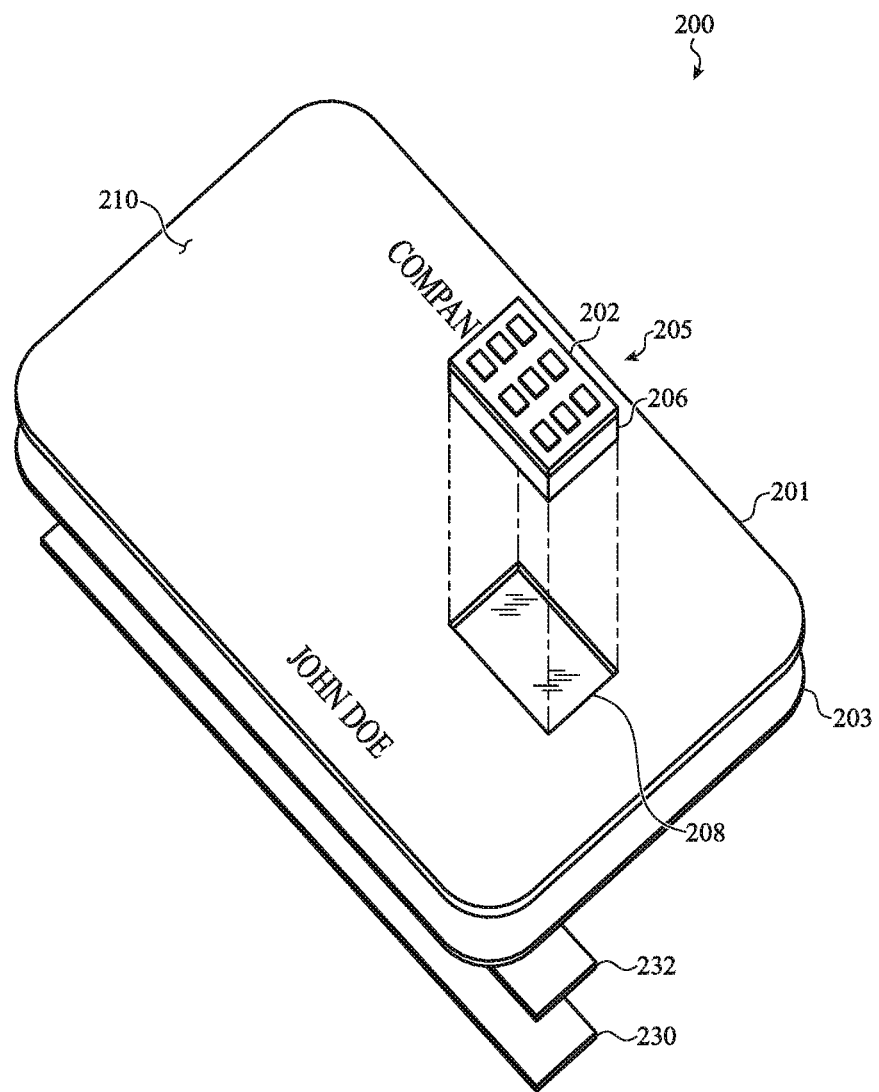
FIG. 2 depicts an exploded view of an example electronic card.

FIG. 2 depicts an exploded view of another example electronic card 200. Similar to the previous example, as shown in FIGS. 1A-1C, the electronic card 200 includes a recess 208 formed into the front surface 210 of the electronic card 200. A chip module 205 including an integrated circuit 206 and a contact plate 202, may be positioned at least partially within the recess 208. In this example, the integrated circuit 206 is positioned at least partially within the recess 208 and the contact plate 202 is positioned over the integrated circuit 206.

As shown in FIG. 2, the electronic card 200 includes a laminated substrate that includes a first layer 201 and a second layer 203. In one example embodiment, the first layer 201 includes a metal or metallic sheet that is formed from aluminum, carbon steel, stainless steel, titanium, or other type of metal or metal alloy. The second layer 203 may be formed from a polymer sheet (e.g., a plastic sheet) and adhered to the first layer 201 using an adhesive or other bonding agent. In some cases, the first layer 201 is laminated to the second layer 203 by pressing two sheets of material together and applying heat or elevating the temperature to create a bond between the two layers. While only two layers are shown in this example, more than two layers may be used in other embodiments. For example, a plastic layer similar to the second layer 203 shown in FIG. 2 may be attached or adhered to the opposite side (e.g., the front side) of the first layer 201. Thus, a first metal layer may be sandwiched or positioned between two or more polymer layers (plastic sheets) to form the electronic card 200.

As shown in FIG. 2, a ferromagnetic stack, including a backing layer 232 and a ferromagnetic element 230 (e.g., a ferromagnetic film), may be attached to the substrate, which does not include a stepped region (in contrast to the example shown in FIG. 1C). In some cases, a thickness of one or more coating or coating layers are deposited adjacent to the ferromagnetic element 230 and the backing layer 232. If the one or more coating or coating layers have a combined thickness that is approximately equal to the combined thickness of the ferromagnetic element 230 and the backing layer 232, the interface, transition, or joint between the ferromagnetic element 230 and the outer surface of the electronic card 200 (formed by one of the coating or coating layers) may be substantially smooth. In some embodiments, the ferromagnetic element 230 is coated by an additional coating or coating layer that extends across the rear surface of the electronic card 200 and masks or obscures the ferromagnetic element 230 from view.

FIGS. 1A-1B and 2 depict example configurations and the position of the various elements may vary depending on the particular implementation. For example, in the example of FIGS. 1A-1B and 2, the ferromagnetic stack or ferromagnetic element and the integrated circuit are positioned on opposite sides of the electronic card. However, in an alternative embodiment, the recess and the stepped region are formed into the same surface (e.g., the front surface) and the integrated circuit and the ferromagnetic element may be positioned along the same side of the electronic card. Furthermore, while in FIGS. 1A-1B and 2 the magnetic region extends along a longer side of the rectangular electronic card, in other implementations, the magnetic region may extend along one or both shorter sides of the rectangular card. In some cases, the magnetic region may extend along two or more sides of the electronic card. Additionally, the location of the contact plate and corresponding integrated circuit may vary depending on the implementation. In some embodiments, the electronic card may not include a contact plate, as depicted in the examples of FIGS. 1A-1B and 2.

The examples of FIGS. 1A-1B and 2 depict electronic cards having a particular shape or form factor. However, depending on the implementation, the length, width, and/or the aspect of the length to the width may vary from the general shapes depicted in FIGS. 1A-1B and 2. In particular, the electronic card may have a width that is greater than a traditional credit card. In another example, the electronic card may have a length that is shorter than a traditional credit card. Similarly, the shape and size of the various elements including the magnetic region or magnetic element may be wider or otherwise vary in dimension with respect to a magnetic strip of a traditional credit card.

Figure 3A:
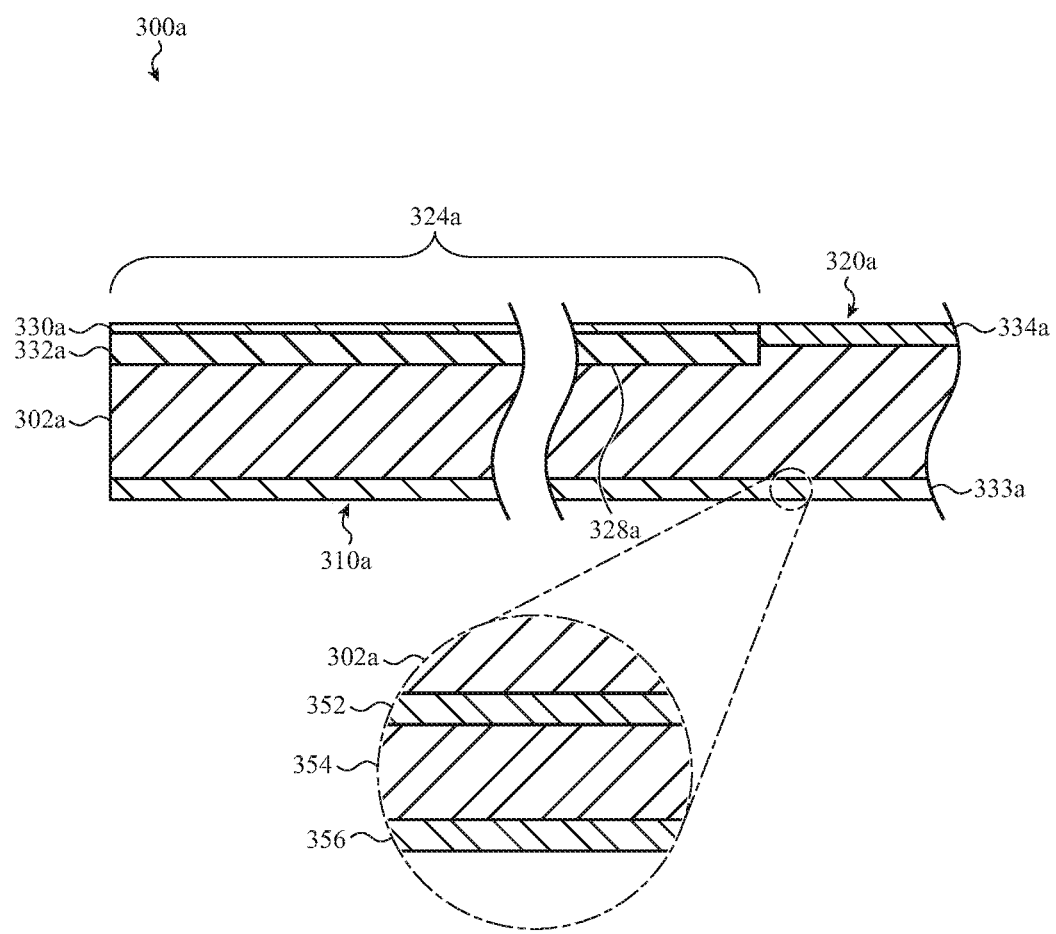
FIGS. 3A-3C depict cross-sectional views of an electronic card.
Figure 3B:
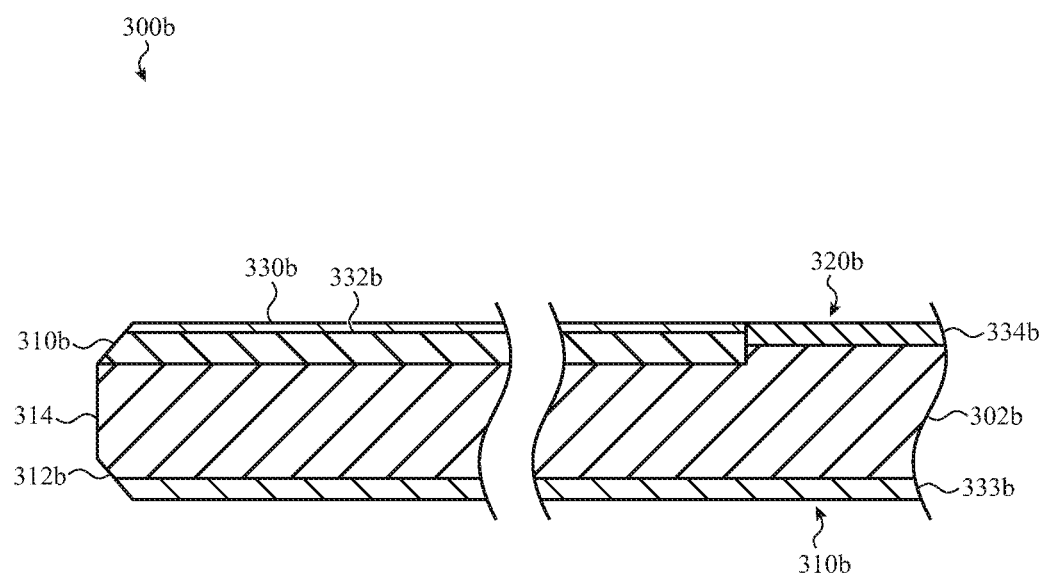
Figure 3C:
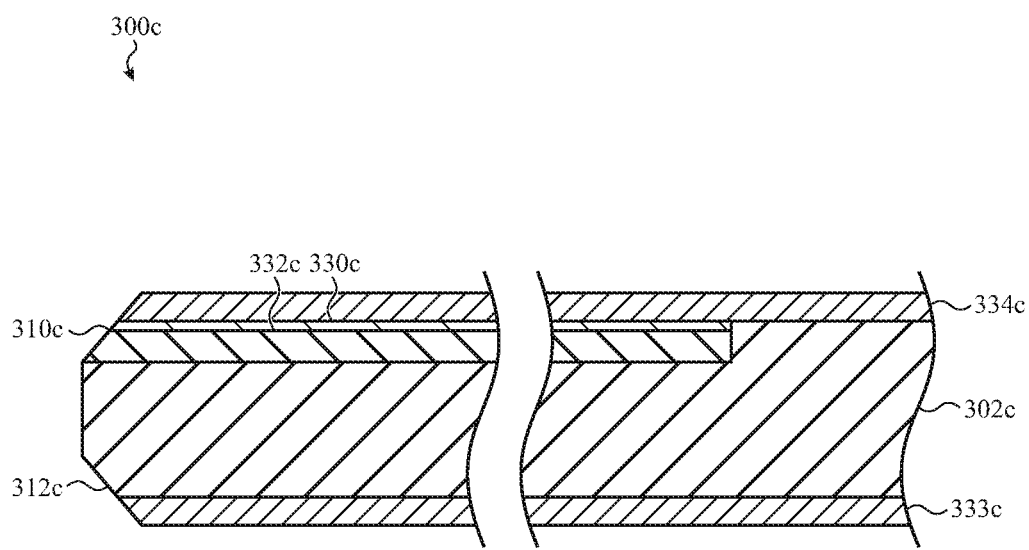

FIGS. 3A-3C depict cross-sectional views of an electronic card 300a, 300b, 300c, which may correspond to section B-B of electronic card 100 shown in FIG. 1B. As shown in FIG. 3A, the electronic card 300a includes a substrate 302a that is coated with a coating or coating layer 333a, 334a. As described with respect to FIG. 3A and with respect to other figures described herein, a coating layer may also be referred to as a coating, a masking layer, or a masking. The description of the coating layer 333a, 334a, substrate 302a, ferromagnetic element 330a, backing layer 333a may extend to other embodiments described with respect to other figures and redundant description of these and other elements may be omitted for or abbreviated for clarity.

FIG. 3A depicts a cross-sectional view of a portion of the electronic card 300a having a magnetic region 324a that may correspond to the magnetic region 124 of FIG. 1B. As shown in FIG. 3A, a ferromagnetic stack including ferromagnetic element 330a (e.g., a ferromagnetic film) at least partially defines the size and location of a magnetic region 324a. The ferromagnetic stack, including the ferromagnetic element 330a and the backing layer 332a, are positioned within the stepped region 328a and have a combined thickness that is approximately equal to the depth of the stepped region 328a to create a substantially flush or smooth interface along the rear surface 320a of the electronic card 300a.

In this example, the stepped region 328a is formed into a substrate 302a. In some implementations, the ferromagnetic element 330a has a thickness that is approximately 1 to 20 μm thick. In some implementations, the ferromagnetic element 330a has a thickness that is approximately 3 to 10 μm thick. In some implementations, the backing layer 332a has a thickness that is approximately 50 to 150 µm thick. In some implementations, the backing layer 332a has a thickness that is approximately 80 to 100 µm thick. In some implementations, the backing layer 332a is approximately 90 µm thick. The thickness of the ferromagnetic stack including a combined thickness of the ferromagnetic element 330a and the backing layer 332a may range between 200 um and 270 um.

The substrate 302a, in this example and with regard to other examples described herein, may be formed from a single material or may be formed from multiple materials that are bonded or laminated together. For example, the substrate 302a may be formed from a metal material (e.g., a metal sheet) including, for example, aluminum, carbon steel, stainless steel, titanium, or other type of metal or metal alloy. The substrate 302a may also be formed from one or more polymers (e.g., a polymer sheet or film) including, for example, polyvinyl chloride, polyethylene-based polymers, PVC, polyester, acrylic, styrene, or polycarbonate. In some implementations, the substrate 302a is formed from a composite material, which may include a filled polymer, carbon fiber, carbon laminate, or other structure formed from two or more materials. In some cases, the substrate 302a may be formed from a ceramic, glass, or other similar type of material. The substrate 302a may be formed as a unitary or homogenous element or, alternatively, may be formed from a laminate of multiple materials or multiple layers (e.g., multiple sheets and/or films) that are bonded or adhered together. For example, the substrate 302a may be formed from a metal sheet (e.g., titanium sheet) and bonded or laminated to one or more polymer sheets (e.g., plastic sheets) to form a laminated multi-layer substrate. In one example, the substrate 302a includes a metal sheet that is bonded to two plastic sheets, each plastic sheet bonded to opposite surfaces of the metal sheet. In another example, the substrate 302a includes a single plastic sheet that is bonded to a surface of the metal sheet. An adhesive or other bonding agent may be used to bond multiple layers together.

The substrate 302a may be formed from a sheet, plate, or multiple layers having a combined thickness that is less than 1 mm. In some cases, the substrate 302a has a combined or overall thickness that is approximately 0.6 to 0.85 mm thick. In some instances, the electronic card 300a has an overall thickness that is less than 1 mm. In some instances, the electronic card 300a has an overall thickness that is approximately 0.6 to 0.85 mm thick. In some instances, the electronic card 300a has an overall thickness that is approximately 0.5 to 0.75 mm thick.

As shown in FIG. 3A, a coating or coating layer 333a may define at least a portion of the front surface 310a and a coating layer 334a may define at least a portion of the rear surface 320a. While coating layers 333a, 334a are designated with different item numbers, the coating layers 333a, 334a may comprise a single continuous coating layer that defines at least a portion of both the front surface 310a and the rear surface 320a. In some cases, the coating layers 333a, 334a may be generally referred to as a single layer, even though the edges of the card may not be coated and the single layer is not continuous. In some cases, the coating layers 333a, 334a each have a thickness of less than 100 µm. In some implementations, the coating layers 333a, 334a each have a thickness of between 50 µm and 10 µm. In some implementations, the coating layers 333a, 334a have a thickness of approximately 60 µm.

In this example and in other examples described herein, the coating layers (333a, 334a) may be scratch resistant and/or chip resistant to provide a durable coating for the electronic card. In some cases, the coating layers are substantially stain resistant and may be substantially impervious to staining or discoloration with normal use. As described herein, the coating layer or layers may have a hard coat or coating layer that provides both structural durability and inhibits discoloration of the electronic card for expected use of the electronic card.

While coating layers 333a, 334a in FIG. 3A and in other figures throughout the disclosure may be depicted as being a single homogenous or unitary layer, the coating layers may be formed from multiple layers or regions. For example, as shown in the detail view, the coating layers 333a, 334a may include a primer layer 352 positioned over a surface of the substrate 302a, a first layer 354 formed over a surface of the primer layer 352, and a second layer 356, including a hard coat or transparent layer, formed over a surface of the first layer 354.

The first layer 354 may include one or more polymer materials. While depicted as being a distinct and separate layer, in some instances, the first layer 354 includes the primer layer 352 that is adhered to a surface of the substrate 302a. The first layer 354 may include one or more additional urethane materials that are bonded or adhered to the substrate 302a via the first urethane layer or primer layer 352. The primer layer 352 may be specially formulated to both adhere to a metal substrate (e.g., titanium, stainless steel) and adhere to the color layer or first layer 354 that may include a significant concentration of a particular pigment like titanium oxide. The one or more additional urethane materials may include a dual urethane or polyurethane formulation that is applied to the first urethane layer or primer layer 352.

In some implementations, the first layer 354 of the coating layers 333a, 334a may be formed from a polymer material having a pigment dispersed within the polymer material. The first layer 354 may also be referred to herein as a polymer layer, color layer, and/or pigment layer. The pigment particles dispersed within the polymer layer may be inorganic pigment particles including, without limitation, metal oxides such as titanium oxides ($TiO_2$, $Ti_2O_3$), zinc oxides (ZnO), manganese dioxide ($MnO_2$), and iron oxides ($Fe_3O_4$). In some cases the pigment includes one or more of aluminum oxide, cobalt, copper, or other pigment that is suitable for use for a consumer product. The particles may have a size range of 0.1 µm to 10 µm or 0.1 µm to 1 µm. The polymer layer may further comprise other additives.

In some cases, the coating layers 333a, 334a include a second layer 356 that is formed over the first layer 354, such as a polymer layer, color layer, or pigment layer, which may include a polymer and pigment, as described above. In some cases, the second layer 356 may be a transparent layer that is transparent, translucent, and/or is formed from a transparent polymer. The transparent polymer may have a hardness and/or an abrasion resistance greater than the underlying first layer. For example, the second layer 356 may comprise an acrylate polymer or an epoxy polymer. The second layer 356 may include a UV-curable material that is cured with exposure to a UV light source to create a hardened exterior surface. The second layer 356 may also comprise filler materials, such as nanoscale inorganic or diamond materials. Nanoscale filler materials may have a diameter less than 100 nm or less than 50 nm. In some implementations, the second layer 356 comprises a diamond-like carbon (DLC) coating or other similar coating material. For example, the second layer 356 of the coating layers 333a, 334a may include a tetrahedral amorphous carbon material having a thickness that ranges from 1 µm to 50 µm.

The coating layers 333a, 334a, including their constituent components or sublayers, may be deposited on the substrate 302a using a deposition or layer application process. Example deposition or layer application processes include physical vapor deposition (PVD), atomic deposition coating (ALD), spray coating, dip coating, and other similar material deposition processes. Each layer or sublayer of the coating layers 333a, 334a may be applied using a separate deposition process, depending on the type of layer or sublayer that is being applied.

The ferromagnetic element 330a may be formed from a film of material that is capable of magnetically storing or maintaining encoded data or other information. The encoded data or other information may be read using an external card reader or card-reading device. The ferromagnetic element 330a may include a film or thin layer of metal or metalized material that is configured to hold or maintain a magnetic field. In some cases, the ferromagnetic element 330a is formed from a nickel, iron, ferrite, steel, cobalt, or other ferromagnetic material. The ferromagnetic element 330a may be deposited on, laminated to, or otherwise adhered or attached to the backing layer 332a. In some implementations, the ferromagnetic element 330a is deposited (e.g., sputtered, printed, coated) onto the backing layer 332a.

The backing layer 332a may be formed from one or more of a polymer, metal, or other suitable materials and may include an adhesive or bonding agent. In one example, the backing layer 332a includes two or more polycarbonate sheets that are bonded or otherwise adhered together. In one implementation, the backing layer 332a includes a first polycarbonate sheet that is colored white and a second polycarbonate sheet that is transparent or clear. The two or more polycarbonate sheets may be bonded to the substrate 302a by a thermoset adhesive. In another example, the backing layer 332a may include or comprise a pressure-sensitive adhesive (PSA) on one or both surfaces of the backing layer 332a to facilitate attaching the ferromagnetic element 330a to the substrate 302a. In another example, the backing layer 332a is formed from one or more polymer materials (e.g., polycarbonate sheets) and includes an adhesive on one or more sides. The polymer material of the backing layer 332a may also be bonded to the substrate 302a using a heat bonding or heat lamination process that does not use a separate adhesive layer.

The ferromagnetic stack may be processed in order to provide a particular texture. The texture may provide a desired appearance and/or hand feel that corresponds to a texture of other portions of the electronic card 300a. For example, the ferromagnetic stack may be formed from two or more polycarbonate sheets that are bonded to a ferromagnetic film. The ferromagnetic stack may be pressed with a heated texture plate that impresses a texture into an exterior surface of the ferromagnetic stack. In some cases, the impressed texture has a surface roughness that ranges between 0.3 to 1.0 um Ra. In one example, the impressed texture has a surface roughness that is approximately 0.5 um Ra or greater.

The examples described herein may be used to form a ferromagnetic stack that is thinner than some traditional magnetic strips. In some implementations, the ferromagnetic element 330a has a thickness that ranges from 0.005 mm to 0.05 mm and the backing layer 332a has a thickness that ranges from 0.05 mm to 1.5 mm. The thickness of the ferromagnetic stack including a combined thickness of the ferromagnetic element 330a and the backing layer 332a may range between 200 um and 270 um.

FIG. 3B depicts an example electronic card 300b having chamfer features or chamfered edges. The electronic card 300b may include elements and features as described herein with respect to other electronic card embodiments, the descriptions of which are omitted for clarity. As shown in FIG. 3B, the electronic card 300b includes chamfered edges 310b and 312b (example chamfer features) formed along the edge of the electronic card 300b. While FIG. 3B depicts example chamfered edges 310b and 312b, the electronic card 300b may include chamfered edges that extend along all of the outer edges of the card (e.g., along the set of edges 116 of FIG. 1A and the set of edges 122 of FIG. 1B).

In this example the chamfered edge 310b is defined, at least in part, by a beveled region formed within the ferromagnetic element 330b and the backing layer 332b. As shown in FIG. 3B, the chamfered edge 310b does not extend beyond the beveled edge of the ferromagnetic element 330b and the backing layer 332b. Thus, the chamfered edge 310b is defined, at least in part, by the beveled edge formed within the ferromagnetic element 330b and the backing layer 332b. Stated another way, the beveled edge of the ferromagnetic element 330b and the backing layer 332b ends at a (vertical) sidewall 314 or edge of the substrate 302b. In general, the sidewall 314 is approximately perpendicular to the surfaces 320a and 310b, as shown in FIG. 3B.

As shown in FIG. 3B, the electronic card 300b includes coating layers 333b, 334b that extend over at least a portion of the front surface 310b and the rear surface 320b of the electronic card 300b. As described above with respect to FIG. 3A and other embodiments herein, the coating layers 333b, 334b may be formed from multiple layers. Specifically, the coating layers 333b, 334b may include a first layer that includes a polymer and pigment dispersed within and a second, outer layer formed over the first layer. The second or outer layer may include a transparent polymer and/or a diamond-like carbon (DLC) coating. As discussed previously, while the coating layers 333b, 334b are designated in FIG. 3B by two item numbers, the coating layers 333b, 334b may be formed from a single continuous or coating layer.

FIG. 3C depicts another example electronic card 300c. The electronic card 300c may include elements and features as described herein with respect to other electronic card embodiments, the descriptions of which are omitted for clarity. FIG. 3C depicts an electronic card 300c having coating layers 333c, 334c that extend over substantially all or nearly all of the front and rear surfaces of the electronic card 300c. As shown in FIG. 3C, the coating layer 334c extends over the rear surface including over the ferromagnetic stack including the ferromagnetic element 330c and backing layer 332c. As discussed previously, the ferromagnetic stack may define the magnetic region of the electronic card 300c (see, for example, region 124 of FIG. 1B). By extending the coating layer 334c over the ferromagnetic element 330c, the ferromagnetic element 330c may be concealed from view. In some cases, the coating layer 334c may provide a continuous and/or uniform visual appearance across a transition between the magnetic region and adjacent or surrounding regions of the electronic card 300c. While the coating layer 334c may conceal the transition between the ferromagnetic element 330c and an adjacent portion of the electronic card 300c, there may be additional markings or indicia that are formed on or into the coating layer 334c and that indicate an approximate location of the magnetic region or edge of the ferromagnetic element 330c and/or a boundary of an encoded region within a magnetic region defined by the ferromagnetic element 330c.

In general, the coating layer 334c is configured to pass magnetic signals and/or magnetically encoded information that is stored or encoded on the ferromagnetic element 330c. Specifically, the coating layer 334c may be formed from a dielectric or non-conductive material and may be thin enough to allow reliable communication between the ferromagnetic element 330c and an external card reader or card-reading device. In some instances, the coating layer 334c is approximately 60 µm or less in thickness. In some instances, the coating layer 334c is approximately 30 µm or less in thickness. In some instances, the coating layer 334c is approximately 20 µm or less in thickness.

The coating layer 334c typically includes at least one layer or region that includes a pigment dispersed within the coating layer 334c to help conceal or mask the underlying substrate 302c and/or ferromagnetic element 330c. The thickness of the coating layers 333c, 334c may depend, at least in part, on the color of the pigment. For example, darker pigments may be able to conceal underlying elements or components with thinner coating than lighter or white pigments.

As discussed above with respect to FIG. 3A, the coating layer 334c may also include an outer layer or coating that may have a hardness that resists wear and/or scratches. In some cases the outer layer is a transparent polymer, such as an acrylic (e.g., acrylate polymer) or an epoxy (e.g., epoxy polymer). In some cases, the coating layer 334c includes a UV-curable polymer. In some cases, the outer layer or coating includes a diamond-like carbon (DLC) coating. The thickness of the DLC coating may range from approximately 1 µm to 50 µm.

As shown in FIG. 3C, the coating layer 334c, the ferromagnetic stack, including the ferromagnetic element 330c and the backing layer 332c, at least partially defines the chamfered edge 310c. Similarly, coating layer 333c and the substrate 302c at least partially define the chamfered edge 312c. As discussed previously, while the coating layers 333c, 334c are designated in FIG. 3C by two item numbers, the coating layers 333c, 334c may be formed from a single continuous or coating layer. The coating layers 333c, 334c may also be referred to as a single layer even though the coating layer does not extend around the edges of the card and is a discontinuous layer from the front to the back of the electronic card 300c.

Figure 4:
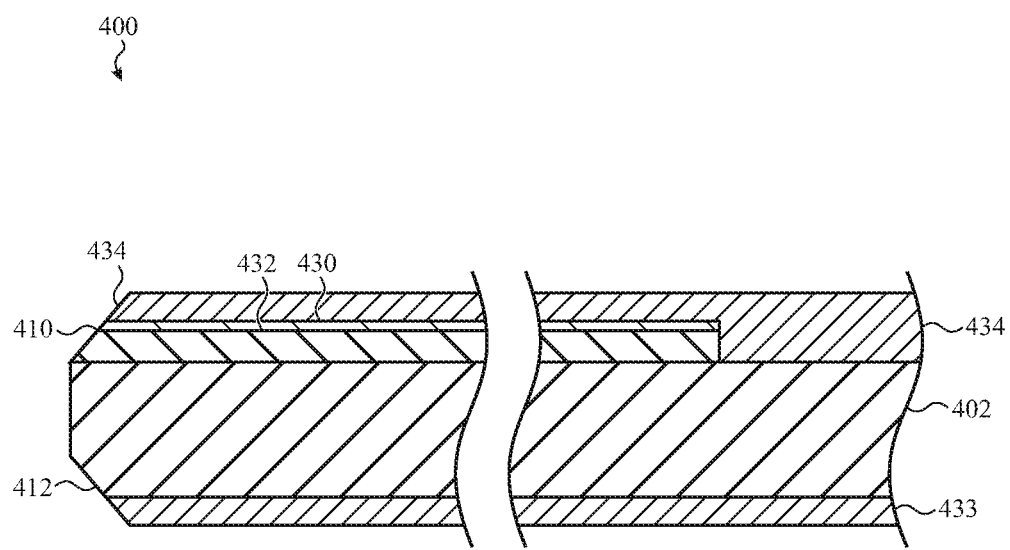
FIG. 4 depicts a cross-sectional view of an electronic card.

FIG. 4 depicts another example electronic card 400. The electronic card 400 may include elements and features as described herein with respect to other electronic card embodiments, the descriptions of which are omitted for clarity. FIG. 4 depicts an electronic card 400 having coating layers 433, 434 that extend over substantially all or nearly all of the front and rear surfaces of the electronic card 400. The cross-sectional view of FIG. 4 corresponds to the configuration of FIG. 2 in which the ferromagnetic element 230 and the backing layer 232 are not positioned within a recess or groove. As shown in FIG. 4, the coating layer 434 extends over the rear surface including over the ferromagnetic element 430 of the magnetic region (see, e.g., region 124 of FIG. 1B). By extending the coating layer 434 over the ferromagnetic element 430, the ferromagnetic element 430 may be concealed from view. As shown in FIG. 4, the coating layer 434 does not have a uniform thickness in order to accommodate the thickness of the ferromagnetic element 430 and the backing layer 432.

Similar to the previous example, the coating layer 434 may provide a continuous and/or uniform visual appearance across a transition between the magnetic region and adjacent or surrounding regions of the electronic card 400. While the coating layer 434 may conceal the transition between the ferromagnetic element 430 and an adjacent portion of the electronic card 400, there may be additional markings or indicia that are formed on or into the coating layer 434 and that indicate an approximate location of the magnetic region or edge of the ferromagnetic element 430 and/or a boundary of an encoded region within a magnetic region defined by the ferromagnetic element 430.

In general, at least a portion of the coating layer 434 is configured to pass magnetic signals and/or magnetically encoded information that is stored or encoded on the ferromagnetic element 430. Specifically, the coating layer 434 may be formed from a dielectric or non-conductive material and may be thin enough to allow reliable communication between the ferromagnetic element 430 and an external card reader or card-reading device. In some instances, the coating layer 434 is approximately 60 µm or less in thickness in a region that extends over the ferromagnetic element 430. In some instances, the corresponding region of the coating layer 434 is approximately 30 µm or less in thickness. In some instances, the corresponding region of the coating layer 434 is approximately 20 µm or less in thickness.

Similar to previous examples, the coating layer 434 typically includes at least one layer or region that includes a pigment dispersed within the coating layer 434 to help conceal or mask the underlying substrate 402 and/or ferromagnetic element 430. The thickness of the coating layers 433, 434 may depend, at least in part, on the color of the pigment. For example, darker pigments may be able to conceal underlying elements or components with thinner coating than lighter or white pigments.

As discussed above with respect to FIGS. 3A and 3C, the coating layer 434 may also include an outer layer or coating that may have a hardness that resists wear and/or scratches. In some cases the outer layer is a transparent polymer, such as an acrylic (e.g., acrylate polymer) or an epoxy (e.g., epoxy polymer). In some cases, the coating layer 434 includes a UV-curable polymer. In some cases, the outer layer or coating includes a diamond-like carbon (DLC) coating. The thickness of the DLC coating may range from approximately 1 µm to 50 µm.

As shown in FIG. 4, the coating layer 434, the ferromagnetic element 430 and the backing layer 432 at least partially define the chamfered edge 410. Similarly, coating layer 433 and the substrate 402 at least partially define the chamfered edge 412. As discussed previously, while the coating layers 433, 434 are designated in FIG. 4 by two item numbers, the coating layers 433, 434 may be formed from a single continuous or coating layer.

Figure 5A:
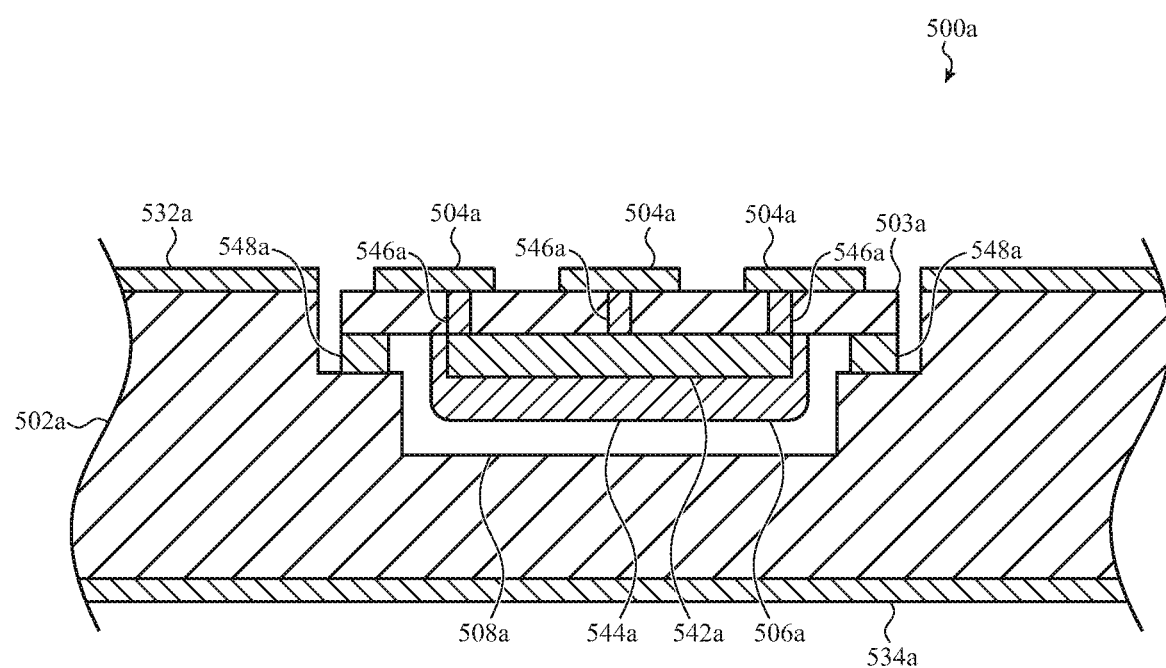
FIGS. 5A-5C depict cross-sectional views of the electronic card.

FIG. 5A depicts a cross-sectional view of an electronic card 500a. The cross-sectional view may correspond to the section A-A indicated on FIG. 1A. As shown in FIG. 5A, the electronic card 500a includes an integrated circuit 506a positioned at least partially within the recess 508a formed into the substrate 502a of the electronic card 500a. The contact plate 503a is positioned over the integrated circuit 506a and is also at least partially disposed in the recess 508a. The integrated circuit 506a and/or the contact plate 503a may be coupled or integrated to define a chip module that is approximately 1 cm square. The dimensions of the integrated circuit 506a and/or the contact plate 503a may vary depending on the implementation and they may have a rectilinear shape having a width and length that ranges between 0.5 cm to 2 cm. It is not necessary that the length and width be equal or substantially equal. In some instances, the integrated circuit 506*a* and/or the contact plate 503*a* are circular or rounded in shape or profile.

As shown in FIG. 5A, the contact plate 503*a* includes an array of terminal electrodes 504*a* that are exposed and define at least a portion of an external surface of the electronic card 500*a*. The depth of the recess 508*a* and/or the thickness of the integrated circuit 506*a* and contact plate 503*a* may be configured to provide a substantially smooth or flush surface along the front of the electronic card 500*a*. In some implementations, the array of terminal electrodes 504*a* protrude slightly from the front surface of the electronic card 500*a* in order to facilitate physical and electrical connection with an external card reader or card-reading device. As shown in FIG. 5A, the front and rear surfaces of the electronic card 500*a* may be defined, at least in part, by the coating layers 532*a* and 534*a*.

As shown in FIG. 5A, the contact plate 503*a* may be attached to the substrate 502*a* by adhesive 548*a*. The adhesive 548*a* may include a pressure-sensitive adhesive, an epoxy adhesive, a hot-melt bonding material, or some other type of adhesive material or component. In the present example, the contact plate 503*a* is attached to a shelf region formed within the recess 508*a*. By attaching the contact plate 503*a* to a shelf region, the combined thickness of the adhesive 548*a* and the contact plate 503*a* may be more easily controlled or predicted to provide a more consistent or uniform location of the array of terminal electrodes 504*a* with respect to the exterior surface of the electronic card 500*a*.

In some implementations, the shelf region and/or a surface of the contact plate 503*a* are textured or otherwise prepared to promote adhesion to the adhesive 548*a*. For example, the shelf region of the recess 508*a* may be textured with a laser to create small surface features that improve the bonding between the shelf region of the recess 508*b* and the adhesive 548*a*. In some cases, the surface is ablated with a laser to create micro-sized features that increase the bonding surface area and also improve the bonding strength between the recess 508*b* and the adhesive 548*a*. In some embodiments, a laser-based process is used to ablate the surface of the shelf region and produce a surface roughness of approximately 1.0 um Ra, which may increase the bond strength between the substrate 502*a* and the adhesive 548*a*. In some cases, a laser-based process is used to produce a surface roughness that ranges between 0.5 um and 2 um Ra. In some instances, the shelf region of the recess 508*a* is textured using a mechanical texturing process and/or chemical texturing process that produces the desired surface roughness.

The surface of the shelf region of the recess 508*a* may also be coated with a color layer or coloring agent to produce a black or dark color along the shelf region. This may help with the cosmetic appearance of the transition between the contact plate 503*a* and the surrounding portions of the electronic card 500*a*. While these features and bonding techniques are described with respect to the electronic card 500*a* of FIG. 5A, the same techniques may be applied to other embodiments including those shown in FIGS. 5B and 5C.

The recess 508*a* and/or the adhesive 548*a* may also include one or more venting features that allow gas or vapors to escape the recess 508*a* during manufacturing or other situations. For example, small grooves may be formed into the shelf region and/or the adhesive 548*a* to allow hot gas or vapor to exit the recess 508*a*. In one implementation, the shelf region defines a groove ranging between 0.5 mm and 1 mm square to allow for the passage of gas or vapors. Additionally or alternatively, the adhesive 548*a* may include a gap ranging between 0.5 mm and 1 mm to allow for the passage of gasses or vapors. The venting features may help gasses or vapors escape during a heated bonding or lamination process in which heat is applied to one or more surfaces of the electronic card 500*a*. In some cases, the venting features defined into the adhesive and/or the recess may facilitate a higher temperature bonding or manufacturing process. While the venting features are described with respect to the electronic card 500*a* of FIG. 5A, the same techniques may be applied to other embodiments including those shown in FIGS. 5B and 5C.

In the example of FIG. 5A, the integrated circuit 506*a* includes a semiconductor 542*a* embedded in an encapsulate portion 544*a*. The semiconductor 542*a* may be electrically coupled to one or more of the array of terminal electrodes 504*a*. In the present example, the semiconductor 542*a* of the integrated circuit 506*a* is coupled to the array of terminal electrodes 504*a* by one or more respective vias or conductive elements 546*a*. In some cases, the vias or conductive elements 546*a* are integrally formed into the contact plate 503*a* and define terminals that are soldered to the integrated circuit 506*a*. The encapsulate portion 544*a* may be formed from a dielectric material and may provide structural support and electrical insulation for the integrated circuit 506*a*.

While a simplified example is depicted in FIG. 5A, the integrated circuit 506*a* and/or the contact plate 503*a* may include additional components or elements not expressly depicted in FIG. 5A. For example, the electronic card 500*a* may also include an antenna and/or wireless communication circuitry that are configured to facilitate wireless communication with an external device, such as a card reader having wireless functionality or capability. In some instances, the integrated circuit 506*a* includes an antenna and/or wireless communication circuitry that is configured to wirelessly communicate with an external device. If the integrated circuit 506*a* and/or the electronic card 500*a* are configured to conduct wireless communications with an external device, the contact plate 503*a* may be omitted or optional.

In general, the integrated circuit 506*a* is configured to provide electronic functionality for the electronic card 500*a*. In particular, the integrated circuit 506*a* may include a microcontroller or other type of processing unit that is configured to perform a particular set of functions. For example, if the electronic card 500*a* is configured to facilitate a financial transaction, the integrated circuit 506*a* may be configured to store and/or produce a security code that is used to authenticate a user or transaction. In some cases, the integrated circuit 506*a* may be configured to provide a unique identification or serial number that may be associated with a user, a user's account, a promotion, a merchant, or some other entity or institution. As discussed in more detail below with respect to FIG. 17, the integrated circuit 506*a* may include other elements or components including, for example, non-volatile computer memory, computer processing units (CPUs), numerical processing units (NPUs), wireless communication circuitry, or other electronic elements, components, or systems.

Figure 6A:
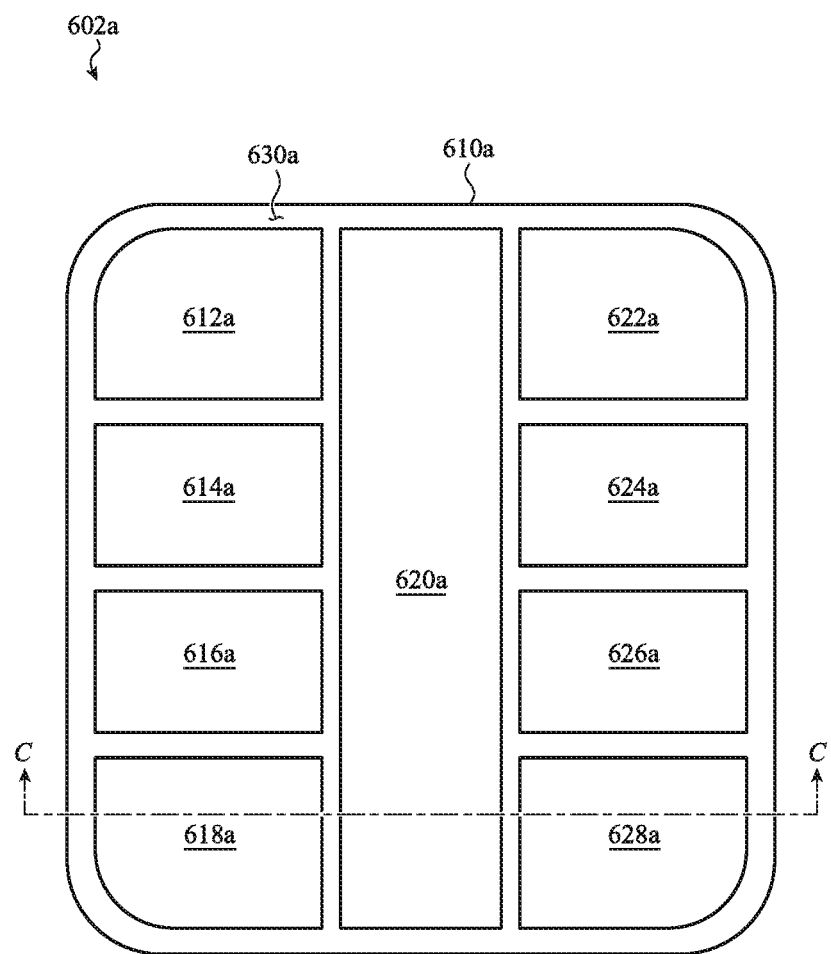
FIGS. 6A-6D depict top views of example contact plates.

FIG. 5A may represent a cross-sectional view of a chip module having a contact plate that is similar to the contact plate 602*a* of FIG. 6A taken along section C-C. Specifically, the contact plate 503*a* and the contact plate 602*a* both include a center electrode (504*a*, 620*a*) that is electrically coupled to the integrated circuit 506*a* by a via 546*a*. However, in an alternative arrangement, one or more of the electrodes may not be electrically coupled to the integrated circuit 506*a* and may be cosmetic in nature.

Figure 5B:
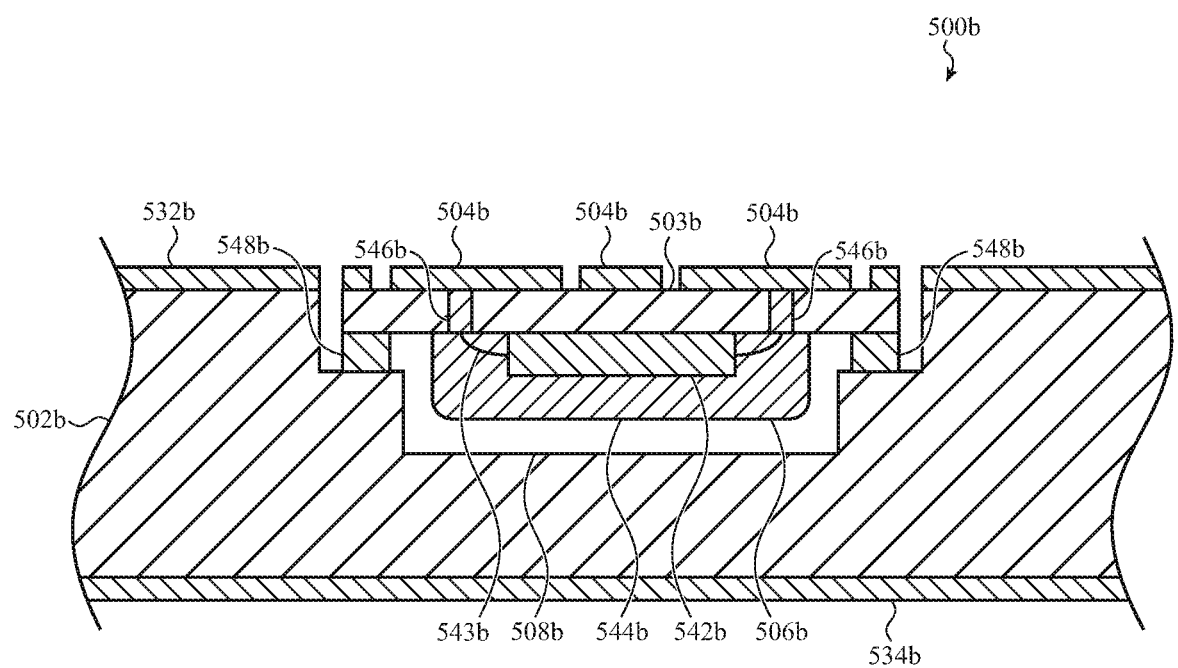

FIG. 5B depicts an alternate arrangement in which a center electrode 504b or center portion is not coupled to the semiconductor 542b of the integrated circuit 506b. The arrangement depicted in FIG. 5B may correspond to the contact plate 602b of FIG. 6B taken along section D-D. As shown in FIG. 5B, the center portion 504b and peripheral portions are not coupled to the semiconductor 542b of the integrated circuit 506b. The left and right electrodes 504b are electrically coupled to the semiconductor 542b by a respective conductor 543b, which may include a wire or other conductive conduit. The semiconductor 542b, the conductor 543b and at least a portion of the via 546b may be encapsulated by the encapsulate portion 544b.

As shown in FIG. 5B, the electronic card 500b includes coating layers 532b, 534b that are formed over respective surfaces of the substrate 502b. Similar to the previous example, the contact plate 503b is coupled to a recess 508b by adhesive 548b, which may be positioned along a ledge or shelf of the recess 508b. The description of the various elements are provided above with respect to previous figures and also apply to the configuration of FIG. 5B. In particular, the recess 508b may include venting features to facilitate the release of gasses or vapors and a shelf portion of the recess 508b may be textured to promote bonding with the adhesive 548b.

Figure 5C:
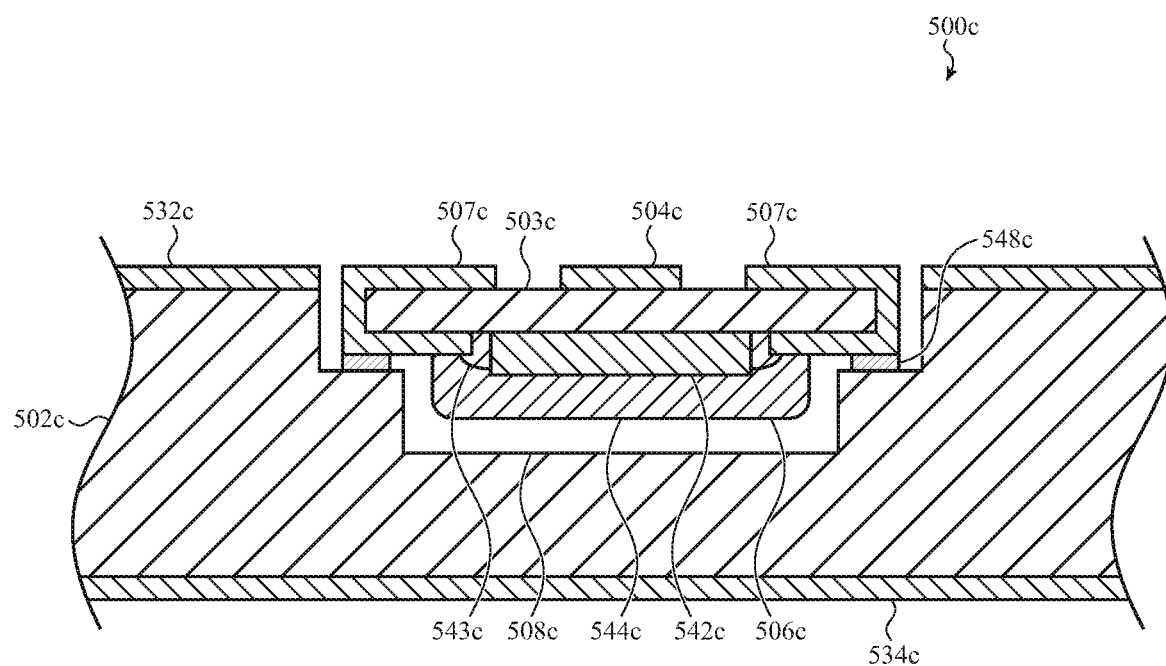

FIG. 5C depicts another alternate arrangement in which a center electrode 504c or center portion is not coupled to the semiconductor 542c of the integrated circuit 506c. Furthermore, the arrangement depicted in FIG. 5C includes terminal electrodes 507c that extend around an edge of the contact plate 503c. In this example, the terminal electrodes 507c are electrically coupled to the semiconductor 542c by a conductive conduit 543c. The semiconductor 542c, the conductive conduit 543c and at least a portion of the terminal electrode that extends along the bottom surface of the contact plate 503c may be encapsulated by the encapsulate portion 544c. The arrangement depicted in FIG. 5C may correspond to the contact plate 602c of FIG. 6C. Specifically, the portion of the terminal electrode 507c that wraps around the contact plate 503c in FIG. 5C may correspond to the connector portion 656c of terminal electrode 652c in FIG. 6C.

As shown in FIG. 5C, the electronic card 500c includes coating layers 532c, 534c that are formed over respective surfaces of the substrate 502c. Similar to the previous example, the contact plate 503c is coupled to a recess 508c by adhesive 548c, which may be positioned along a ledge or shelf of the recess 508c. The description of the various elements are provided above with respect to previous figures and also apply to the configuration of FIG. 5C. In particular, the recess 508c may include venting features to facilitate the release of gasses or vapors and a shelf portion of the recess 508c may be textured to promote bonding with the adhesive 548c.

FIG. 6A depicts a top view of an example contact plate 602a. The contact plate 602a may correspond to the contact plates described above with respect to FIGS. 1A, 1C, 1D, and 5A. The contact plate 602a includes a plate substrate 610a and an array of terminal electrodes 612a, 614a, 616a, 618a, 620a, 622a, 624a, 626a, 628a that are positioned along a front or outer surface of the plate substrate 610a. The terminal electrodes 612a, 614a, 616a, 618a, 620a, 622a, 624a, 626a, 628a are formed from a conductive material and each defines a portion of an exterior surface of the electronic card and may be exposed to facilitate physical contact and electrical connection with an external device, such as an external card reader or card-reading device. In some cases, the terminal electrodes 612a, 614a, 616a, 618a, 620a, 622a, 624a, 626a, 628a may be formed from a copper, nickel, platinum, carbon, silver, gold, alloy, or other conductive material.

In general, the plate substrate 610a defines a set of outer edges that form the profile or perimeter of the plate substrate 610a. As shown in FIG. 6A, each of the terminal electrodes 612a, 614a, 616a, 618a, 620a, 622a, 624a, 626a, 628a is separated or offset from an edge (of the set of outer edges) of the plate substrate 610a. Specifically, as shown in FIG. 6A, the contact plate 602a includes a perimeter portion 630a that surrounds the array of terminal electrodes 612a, 614a, 616a, 618a, 620a, 622a, 624a, 626a, 628a such that each of the terminal electrodes 612a, 614a, 616a, 618a, 620a, 622a, 624a, 626a, 628a is offset from the nearest edge by the width of a respective segment of the perimeter portion 630a. While the perimeter portion 630a depicted in FIG. 6A appears to have a substantially uniform width, in other implementations, the width may vary or have a non-uniform width. For example, a top or bottom segment of the perimeter portion 630a may be greater than or less than a side segment of the perimeter portion 630a. Similarly, the top segment of the perimeter portion 630a may have a width that is different than a bottom segment, and so on.

In FIG. 6A, each of the terminal electrodes 612a, 614a, 616a, 618a, 620a, 622a, 624a, 626a, 628a may be configured to provide an electrical connection for a particular function of the electronic card. By way of example, a first terminal electrode 612a may provide a dedicated power terminal (e.g., a VCC terminal), a second terminal electrode 614a may provide a dedicated reset signal terminal (e.g., a RST terminal), a third terminal electrode 616a may provide a dedicated clock signal terminal (e.g., a CLK terminal), a fourth terminal electrode 618a may provide an auxiliary or programmable terminal, a fifth terminal electrode 620a may provide an auxiliary or programmable terminal, a sixth terminal electrode 622a may provide a dedicated ground terminal (e.g., a GND terminal), a seventh terminal electrode 624a may provide a dedicated programming terminal (e.g., a VPP terminal), and the eighth and ninth terminal electrodes 626a and 628a may provide an auxiliary or programmable terminal.

Figure 6B:
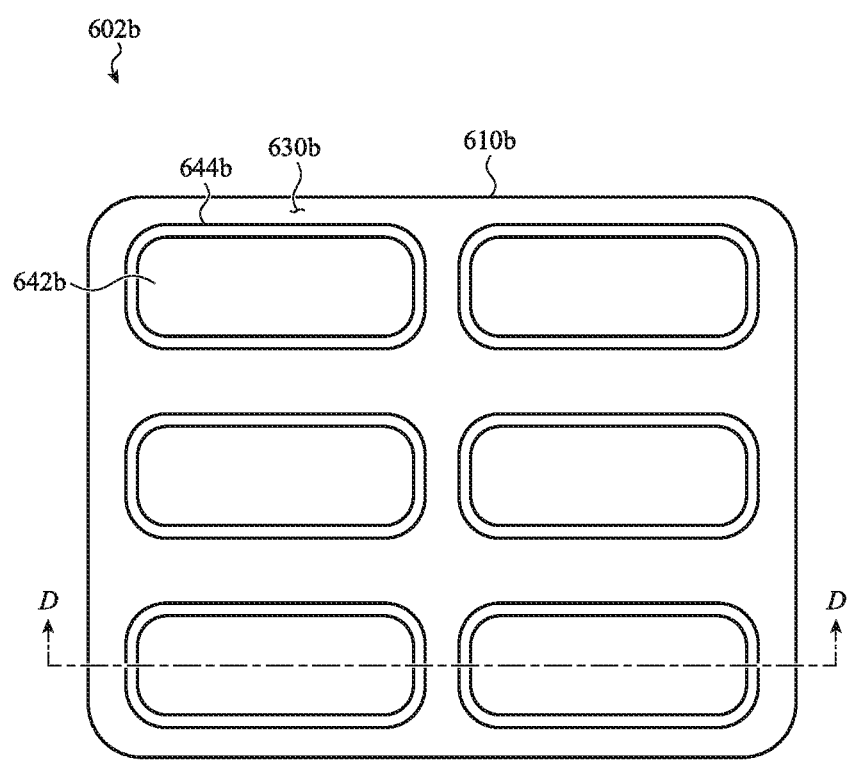
Figure 6C:
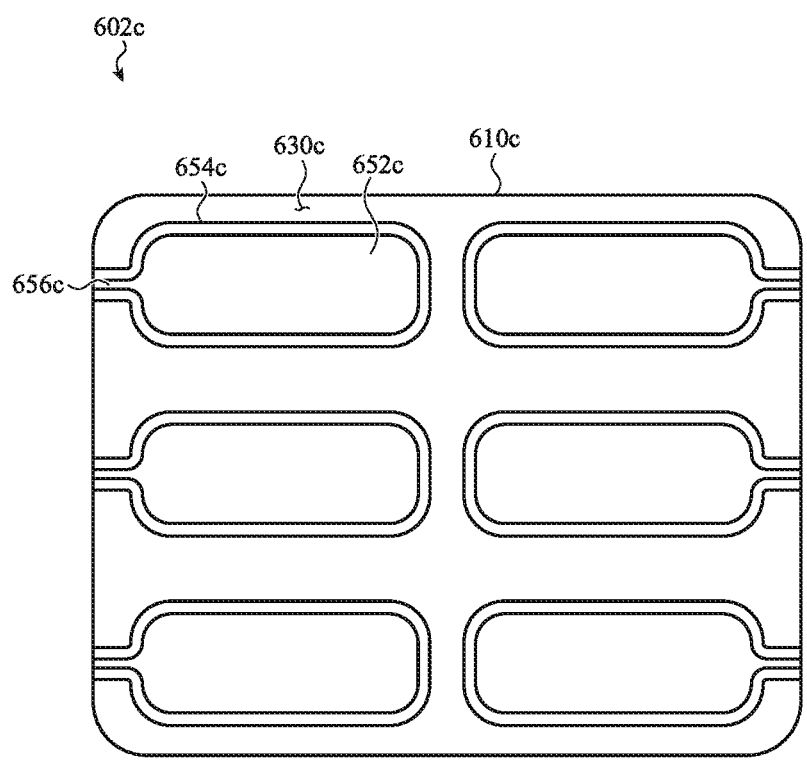
Figure 6D:
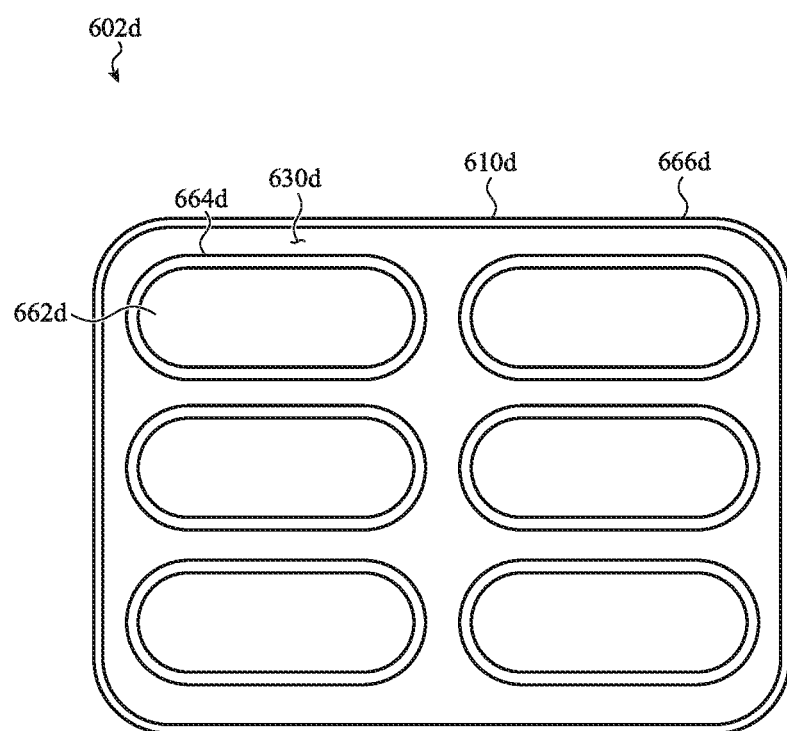

FIGS. 6B, 6C, and 6D depict alternative electrode arrangements for a contact plate. In particular, the contact plates 602b, 602c, and 602d all include a peripheral portion 630b, 630c, 630d that are at least partially coated with a conductive material. The conductive material of the peripheral portions 630b, 630c, 630d may be the same or a similar material that is used to form the terminal electrodes 642b, 652c, 662d. In some cases, the peripheral portions 630b, 630c, 630d and the terminal electrodes 642b, 652c, 662d are formed from one or more of the same layers and are then separated by forming voids or grooves 644b, 654c, 664d within the one or more layers to electrically isolate the terminal electrodes 642b, 652c, 662d from other portions of the one or more layers that form the peripheral portions 630b, 630c, 630d.

In FIG. 6B, the terminal electrodes 642b are separated from the peripheral portion 630b by a void or groove 644b. The void or groove 644b electrically isolates each respective terminal electrode 642b from other conductive elements along the upper surface of the contact plate 602b. In some cases, the grooves 644b expose portions of the plate substrate 610b. Similar to the previous example, the terminal electrodes 642b are offset with respect to the respective edges of the plate substrate 610b. The contact plate 602b of FIG. 6B may correspond to the cross-sectional view depicted in FIG. 5B.

Similar to the previous example, in FIG. 6C, the terminal electrodes 652c are separated from the peripheral portion 630c by a void or groove 654c. The void or groove 654c electrically isolates each respective terminal electrode 652c from other conductive elements along the upper surface of the contact plate 602c. In some cases, the grooves 654c expose portions of the plate substrate 610c. As shown in FIG. 6C, the terminal electrodes 652c each include a connector portion 656c that may extend around the edge of the plate substrate 610c to electrically connect to an integrated circuit or other electrical component. The contact plate 602c of FIG. 6C may correspond to the cross-sectional view depicted in FIG. 5B or 5C.

In FIG. 6D, the terminal electrodes 662d are separated from the peripheral portion 630d by a void or groove 664d. The void or groove 664d electrically isolates each respective terminal electrode 662d from other conductive elements along the upper surface of the contact plate 602d. In some cases, the grooves 664d expose portions of the plate substrate 610d. As shown in FIG. 6D, the contact plate 602d also includes an outer peripheral portion 666d that surrounds the peripheral portion 630d. The outer peripheral portion 666d may not be coated by a conductive coating. In some cases, the outer peripheral portion 666d includes an exposed surface of the plate substrate 610d. The contact plate 602d of FIG. 6D may correspond to the cross-sectional view depicted in FIG. 5A.

Figure 7A:
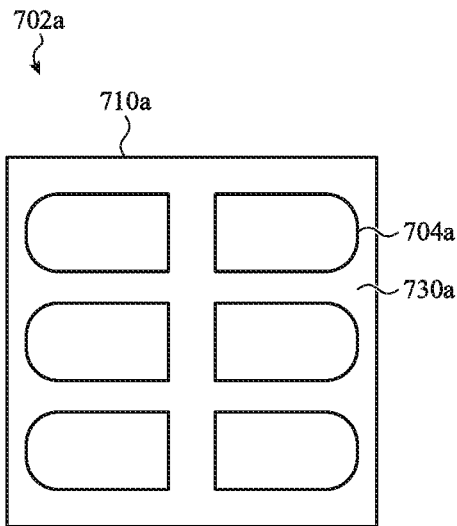
FIGS. 7A-7D depict various example arrays of terminal electrodes.

FIGS. 7A-7D depict various example arrays of terminal electrodes. Specifically, FIG. 7A depicts an example contact plate 702a having an array of terminal electrodes 704a that are rectangular in shape. As shown in FIG. 7A, the terminal electrodes 704a are disposed on an outer or upper surface of a plate substrate 710a and are offset from the edges of the plate substrate 710a by a gap or space. Specifically, the array of terminal electrodes 704a are at least partially surrounded by a perimeter region 730a. In the current example, none of the electrodes of the array of terminal electrodes 704a extend to an edge of the contact plate 702a. However, in alternative embodiments, one or more of the electrodes of the array of terminal electrodes 704a may extend to a respective edge of the contact plate 702a.

Figure 7B:
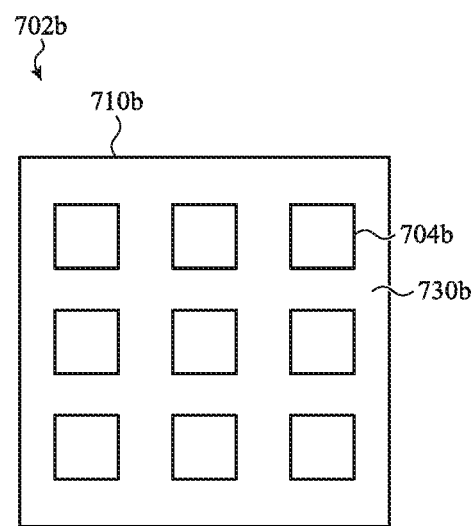

FIG. 7B depicts an example contact plate 702b having an array of terminal electrodes 704b having a square or rectangular shape. Similar to the previous example, the array of terminal electrodes 704b are disposed on a plate substrate 710b and are offset or spaced apart from the edges of the plate substrate 710b. As shown in FIG. 7B, the array of terminal electrodes 704b are at least partially surrounded by a perimeter region 730b of the plate substrate 710b.

Figure 7C:
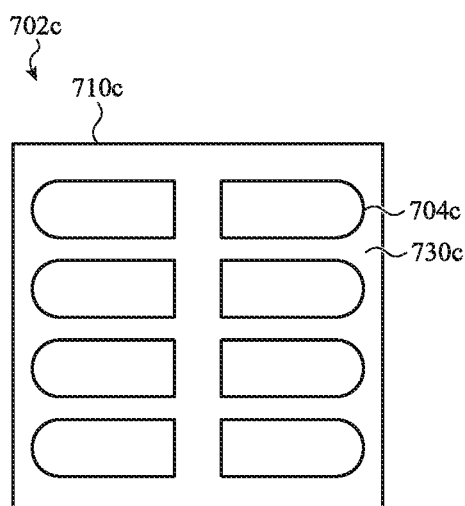

FIG. 7C depicts an example contact plate 702c having an array of terminal electrodes 704c having an elongated shape with rounded corners. Similar to the previous examples, the array of terminal electrodes 704c are disposed along or on a plate substrate 710c and are offset or spaced apart from the edges of the plate substrate 710c. As shown in FIG. 7C, the array of terminal electrodes 704c are at least partially surrounded by a perimeter region 730c of the plate substrate 710c.

Figure 7D:
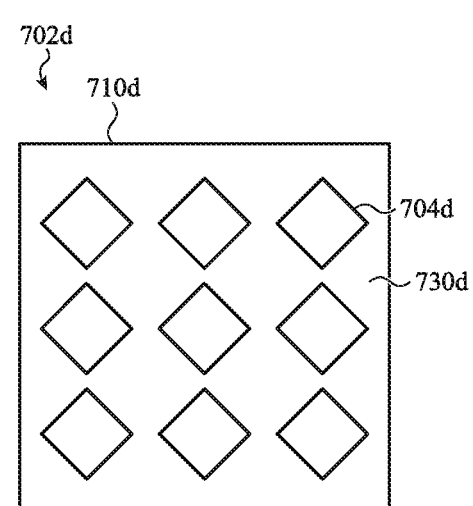

FIG. 7D depicts an example contact plate 702d having an array of terminal electrodes 704d having a diamond shape. Similar to the previous examples, the array of terminal electrodes 704d are disposed on a plate substrate 710d and are offset or spaced apart from the edges of the plate substrate 710d. As shown in FIG. 7D, the array of terminal electrodes 704d are at least partially surrounded by a perimeter region 730d of the plate substrate 710d.

The terminal electrode configurations depicted in FIGS. 7A-7D are provided by way of example and are not intended to be an exhaustive description of all possible configurations. For example, it is not required that the electrodes of an array of terminal electrodes have a similar or the same shape or that they be arranged in a uniform pattern. The terminal electrodes may vary in shape and position within the array, depending on the particular implementation. Furthermore, it is not necessary that all of the terminal electrodes be offset or spaced apart from the edges of the contact plate or plate substrate. In some examples, one or more of the electrodes may extend to a respective edge of the contact plate or plate substrate. Moreover, it is not necessary that each of the terminal electrodes is electrically coupled to an integrated circuit or other electrical component. For example, one or more of the terminal electrodes may be cosmetic in nature or "dummy" terminal electrodes that do not perform an electrical function.

Figure 8A:
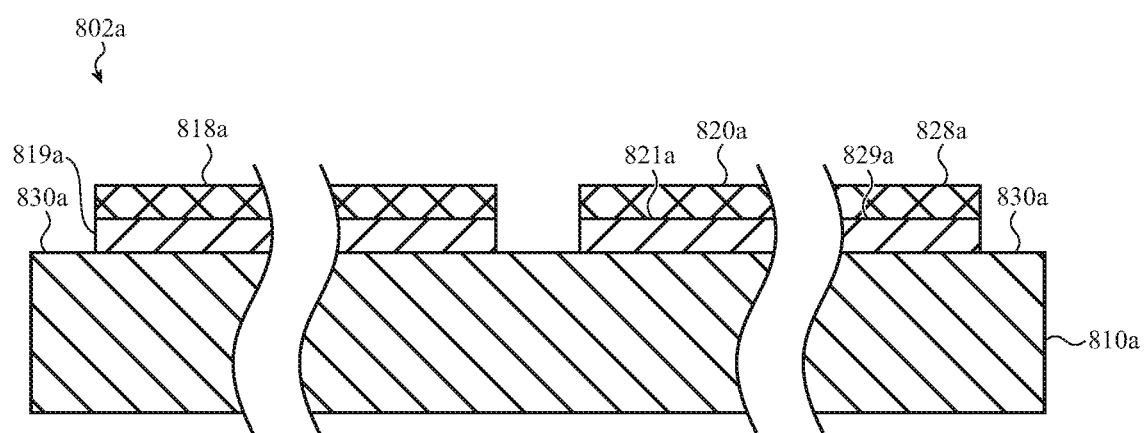
FIGS. 8A-8B depict example cross-sectional views of the example contact plate of FIG. 6.
Figure 8B:
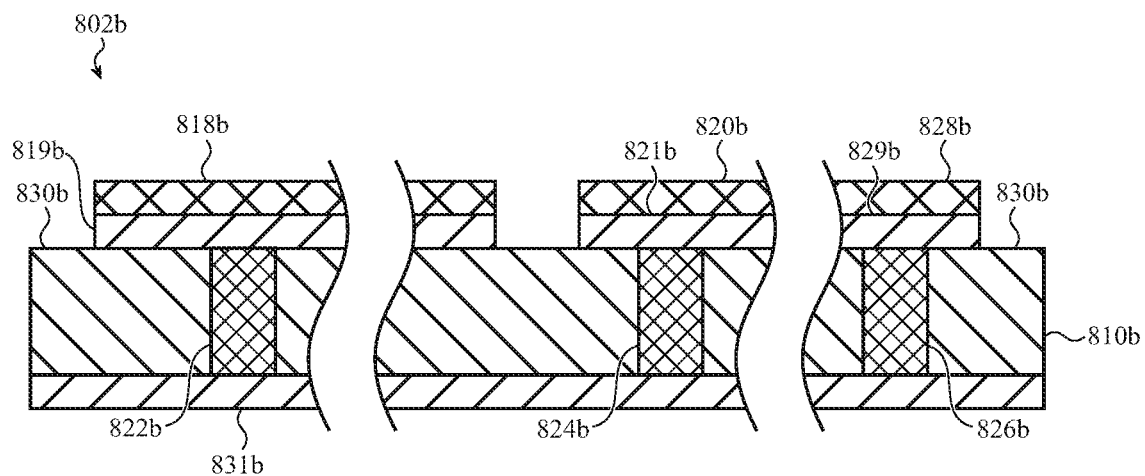

FIGS. 8A-8B depict example cross-sectional views of the example contact plate of FIG. 6. In particular, FIG. 8A depicts an example contact plate 802a that corresponds to the contact plate 602a, 602b, 602c, 602d of FIGS. 6A-6D. As shown in FIG. 8A, the contact plate 802a includes terminal electrodes 818a, 820a, 828a that are disposed or positioned on an upper or front surface of the plate substrate 810a. In this example, the plate substrate 810a may be formed from a non-metallic material including, for example, a polymer or composite material. Example suitable polymer materials for the plate substrate 810a include, but are not limited to, polycarbonate, phenolic, polysulfone, polyethersulfone, polycetal, polyester resins (e.g., polyethylene, polyester, PVC), and other suitable polymers. Example suitable composite materials for the plate substrate 810a include, but are not limited to, fiber-reinforced plastics, fiberglass composite, carbon-fiber composites, laminated composites, and other suitable composite materials. In some examples, the plate substrate 810a may be formed, at least in part, from a metal material including, for example, steel, stainless steel, aluminum, copper, titanium, alloy, or other metal material. The plate substrate 810a may also be formed from a ceramic, glass, or other similar type of material. In some cases, the plate substrate 810a is formed from a metal sheet that has been stamped or machined from a larger plate or sheet.

If the plate substrate 810a is formed from a metal or conductive material, the terminal electrodes 818a, 820a, 828a may be formed along the upper or outer surface of the plate substrate 810a using an electroplating process. If the plate substrate 810a is formed from a non-conductive material, then the terminal electrodes 818a, 820a, 828a may be formed using a combination of electroless and electroplating processes, as described below.

Whether the plate substrate 810a is formed from a conductive or non-conductive material, a pattern of exposed areas that corresponds to the pattern of the array of terminal electrodes may be formed using a photoresist masking process. In one example process, a photoresist layer is applied to the upper or outer surface of the plate substrate 810a. A photoresist mask is then positioned over the photoresist layer. The photoresist mask may include either a positive pattern or a negative pattern that corresponds to the pattern of the array of terminal electrodes that is to be formed (see e.g., the pattern of nine terminal electrodes depicted in FIG. 6). Whether the photoresist mask is a positive pattern or a negative pattern depends on the type of photoresist material that is used (positive resist or negative resist), as described below.

The photoresist layer may then be exposed using a light source (e.g., a UV light source or broad spectrum light source). Exposure using the light source may have different effects on the photoresist layer depending on the type of photoresist material that is used. In one example, if the photoresist is a negative-resist type photoresist material, exposure to the light may cause crosslinking within the photoresist material making the exposed portions insoluble to a photoresist developer. In another example, if the photoresist is a positive-resist type photoresist material, exposure to the light may cause uncrosslinking within the photoresist material making the exposed portions soluble to a photoresist developer.

Select areas of the upper surface of the plate substrate 810a may be exposed by washing or submerging the exposed photoresist material to a solvent, such as a photoresist developer. Portions of the photoresist material that are soluble to the solvent or photoresist developer are removed and the remaining (insoluble) portions remain to define a plating mask. The pattern of the plating mask may define an array of plating areas that correspond to the location of the terminal electrodes 818a, 820a, 828a.

If the plate substrate 810a is formed from a conductive material, the terminal electrodes 818a, 820a, 828a may be formed using an electroplating process. In one example, a first layer of the terminal electrodes 819a, 821a, 829a may be formed by submerging or immersing the plate substrate 810a in a plating solution containing metal cations. An electrical current is then passed through the conductive material of the plate substrate 810a resulting in a thin film of metal being formed along the exposed plating areas formed within the plating mask. In the current example, a first solution is used to form a first conductive layer of the terminal electrodes 819a, 821a, 829a using a first electroplating process. Then, a second solution having different metal cations may be used to form a second or outer conductive layer of the terminal electrodes 818a, 820a, 828a. The first or second conductive layers may include, without limitation, copper, silver, nickel, gold, tin, solder, brass or cadmium. The materials used for the first and second layers may be different or they may be the same. In some cases, only a single layer is formed using a single electroplating process to form the terminal electrodes 818a, 820a, 828a.

If the plate substrate 810a is formed from a non-conductive material, the terminal electrodes 818a, 820a, 828a may be formed using a combination of electroless and electroplating processes. In one example, a strike or a flash is applied to the plate substrate 810a to form a thin coating. For example, after the plating mask has been formed over the plate substrate 810a, the exposed portions of the plate substrate 810a may be immersed or submerged in a cleaning and/or an etching solution that increases the micro-roughness of the exposed portions to create micro-pores. An example etching solution may include sulfuric or other types of acid solution. After etching, a palladium or other catalytic solution may be applied to the exposed portions of the plate substrate 810a. The palladium or other catalytic solution may result in a thin layer (e.g., approximately 1 μm thick) of conductive material being formed on the exposed portions of the plate substrate 810a. In some cases, a 1-5 μm thick layer of palladium is formed along the surface of the plate substrate 810a to form the first conductive layer of the terminal electrodes 819a, 821a, 829a.

After the first conductive layer of the terminal electrodes 819a, 821a, 829a is formed on the surface of the plate substrate 810a, one or more additional layers may be formed over the first layer using an electroplating process similar to the process described above. Specifically, the plate substrate 810a and terminal electrodes 819a, 821a, 829a are submerged or immersed in a plating solution containing metal cations. An electrical current is then passed through the terminal electrodes 819a, 821a, 829a resulting in a thin film of metal being formed over the terminal electrodes 819a, 821a, 829a. The resulting layer may define the second conductive layer of the terminal electrodes 818a, 820a, 828a. Similar to the previous example, the second conductive layer may include, without limitation, copper, silver, nickel, gold, tin, solder, brass or cadmium. While only two layers (an electroless first layer and an electroplated second layer) are shown in the example of FIG. 8A, more than one electroplated layer may be formed by subjecting the plate substrate 810a to multiple electroplating processes.

Figure 9A:
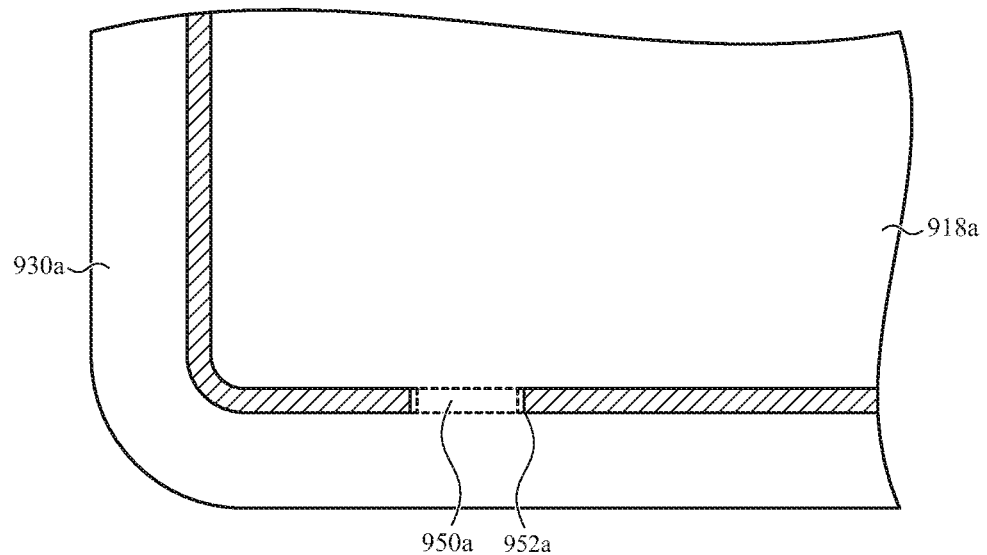
FIGS. 9A-9B depict example connecting structures for a contact plate.
Figure 9B:
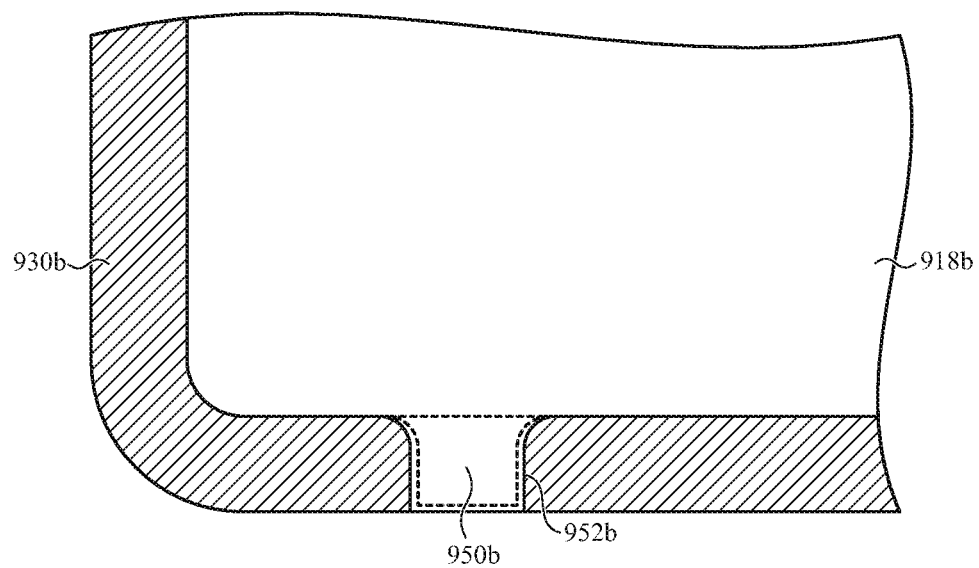

As shown in FIG. 8A, the contact plate 802a includes a perimeter portion 830a that at least partially surrounds the terminal electrodes 818a, 820a, 828a. This results in the desired offset or position that is spaced apart or set off from the corresponding edges of the plate substrate 810a. However, the presence of the perimeter portion 830a makes it difficult to couple a current into the first layer of the terminal electrodes 819a, 821a, 829a to perform the electroplating process or processes. This is particularly true if the contact plate 802a is formed from a larger sheet having an array of contact plates that are treated simultaneously and then cut or separated in order to improve manufacturing throughput and efficiency. FIGS. 8B, 9A, and 9B depict potential solutions that may be used to electrically couple to the first layer of terminal electrodes 819a, 821a, 829a in order to perform an electroplating process.

FIG. 8B depicts a cross-sectional view of another example contact plate 802b. The contact plate 802b may correspond to the contact plate 802a of FIG. 8A. As shown in FIG. 8B, the contact plate 802b includes terminal electrodes 818b, 820b, 828b that are disposed or positioned on an upper or front surface of the plate substrate 810b. In this example, the plate substrate 810b is formed from a non-metallic material including, for example, a polymer or composite material. Example suitable polymer materials for the plate substrate 810a include, but are not limited to, polycarbonate, phenolic, polysulfone, polyethersulfone, polycetal, polyester resins (e.g., polyethylene, polyester, PVC), and other suitable polymers. Example suitable composite materials for the plate substrate 810b include, but are not limited to, fiber-reinforced plastics, fiberglass composite, carbon-fiber composites, laminated composites, and other suitable composite materials.

As described above with respect to FIG. 8A, the terminal electrodes 818b, 820b, 828b may be formed along a non-conductive plate substrate 810b using a combination of electroless and electroplating processes. Initially, a plating mask may be formed over an upper or outer surface of the plate substrate 810b. Similar to the example provided above with respect to FIG. 8A, a photoresist material may be selectively exposed and then washed to create a plating mask having an array of areas that correspond to a pattern of the array of terminal electrodes 818b, 820b, 828b.

Also similar to as described above with respect to FIG. 8A, a first conductive layer of terminal electrodes 819b, 821b, 829b may be formed by applying a strike or flash to form a thin layer of conductive material. In particular, the exposed portions of the plate substrate 810b may be cleaned and etched before being immersed or submerged in a palladium or other catalytic solution. The resulting electroless process may result in a 1-5 µm thick layer of palladium that is formed along the surface of the plate substrate 810*b* to form the first conductive layer of the terminal electrodes 819*b*, 821*b*, 829*b*.

After performing the electroless plating process, one or more subsequent electroplating processes may be used to form the terminal electrodes 818*b*, 820*b*, 828*b*. As discussed above, the presence of the perimeter portion 830*b* may make it difficult to couple a current into each of the first conductive layer of terminal electrodes 819*b*, 821*b*, 829*b* to perform an electroplating process. As discussed above, the desired perimeter portion 830*b* results in the terminal electrodes 818*b*, 820*b*, 828*b* being offset or set back from the respective edges of the plate substrate 810*b*.

To help solve the problem of passing a current through the first conductive layer of terminal electrodes 819*b*, 821*b*, 829*b*, the configuration depicted in FIG. 8B includes a rear conductive layer 831*b* formed along a rear, lower, or inner surface of the plate substrate 810*b*. The rear conductive layer 831*b* may be formed from a conductive material including, without limitation, copper, silver, nickel, gold, tin, solder, brass, conductive carbon, or cadmium. As shown in FIG. 8B, each of the first conductive layer of terminal electrodes 819*b*, 821*b*, 829*b* is electrically coupled to the rear conductive layer 831*b* by a corresponding via, 822*b*, 824*b*, 826*b*, that extend through the plate substrate 810*b*. The vias 822*b*, 824*b*, 826*b* may be formed by drilling holes through the plate substrate 810*b* and then filling the holes with a conductive material. In some cases, the vias 822*b*, 824*b*, 826*b* are formed when forming the rear conductive layer 831*b*. The vias 822*b*, 824*b*, 826*b* and the rear conductive layer 831*b* may be formed from the same conductive material.

Using the configuration depicted in FIG. 8B, an electrical current may be applied to the rear conductive layer 831*b*, which is passed to each of the terminal electrodes 818*b*, 820*b*, 828*b* by a corresponding via 822*b*, 824*b*, 826*b*. Thus, one or more subsequent electroplating processes can be used to form the terminal electrodes 818*b*, 820*b*, 828*b* by applying the current to a single element, the rear conductive layer 831*b*. In some cases, the rear conductive layer 831*b* is part of a larger conductive layer formed along the lower or inner surface of a larger sheet. The larger sheet may have an array of contact plates that are treated simultaneously and then cut or separated in order to improve manufacturing throughput and efficiency.

FIGS. 9A-9B depict example connecting structures for a contact plate. FIGS. 9A and 9B depict additional options for coupling electrical current into a conductive layer of a first conductive layer of a terminal electrode 918*a* in order to perform an electroplating process. As shown in FIG. 9A, a lower or first conductive layer of a terminal electrode 918*a* may be formed over a surface of a plate substrate. The terminal electrode 918*a* may correspond to a lower or first layer of a terminal electrode similar to terminal electrode 618 of FIG. 6. In the example of FIG. 9A, the terminal electrode 918*a* is coupled to a conductive periphery portion 930*a* by a bridge portion 950*a*. In this example, the periphery portion 930*a* is formed from a conductive material or conductive layer that extends all the way to the edge of the plate substrate, which may facilitate an electrical connection to a current source during electroplating. By applying a current to the conductive periphery portion 930*a*, the electrical current may be passed to the terminal electrode 918*a* via the bridge portion 950*a* during an electroplating process.

After performing one or more electroplating processes to form the outer or upper layer of the terminal electrode 918*a*, the bridge portion 950*a* may be removed to electrically isolate the terminal electrode 918*a* from other conductive portions of the card, including the conductive periphery portion 930*a*. The bridge portion 950*a* may be removed by, for example, laser ablating the bridge portion 950*a* using an ablating laser having a spot size that is less than the width of the bridge portion 950*a*. In some cases, after the bridge portion 950*a* is removed, a laser-ablated or ablated region 952*a* is formed, that is over the substantially same area as the bridge portion 950*a* and may expose the (non-conductive) material of the plate substrate. The ablated region 952*a* may be substantially free of conductive material and may electrically isolate the terminal electrode 918*a* from the conductive periphery portion 930*a*. In some cases. the ablated region 952*a* may extend partially into the plate substrate. The bridge portion 950*a* may also be removed using a mechanical cutter, etching solution, or other material removal technique to define a machined region that corresponds to the ablated region 952*a* indicated on FIG. 9A. In some cases, the conductive periphery portion 930*a* is also removed after the outer or upper layer of the terminal electrode 918*a* is formed using an electroplating process.

FIG. 9B depicts another example configuration for coupling electrical current into a conductive layer of a first layer of a terminal electrode 918*b* in order to perform an electroplating process. As shown in FIG. 9B, a lower or first layer of a terminal electrode 918*b* may be formed over a surface of a plate substrate. The terminal electrode 918*b* may correspond to a lower or first layer of a terminal electrode similar to terminal electrode 618 of FIG. 6. In the example of FIG. 9B, the terminal electrode 918*b* is coupled to a bridge portion 950*b* that is formed from a conductive material or conductive layer that extends all the way to the edge of the plate substrate. Similar to the other example provided above, the bridge portion 950*b* may facilitate an electrical connection to a current source during electroplating. By applying a current to the bridge portion 950*b*, an electrical current may be passed to the terminal electrode 918*b* during an electroplating process.

After performing one or more electroplating processes to form the outer or upper layer of the terminal electrode 918*b*, the bridge portion 950*b* may be removed to create an offset or gap between the terminal electrode 918*b* and the corresponding edge of the plate substrate. As shown in FIG. 9B, the contact plate includes a non-conductive periphery portion 930*b* that separates the terminal electrode 918*b* from the edges of the plate substrate. Similar to the previous example, the bridge portion 950*b* may be removed by, for example, laser ablating the bridge portion 950*b* using an ablating laser having a spot size that is less than the width of the bridge portion 950*b*. In some cases, after the bridge portion 950*b* is removed, a laser-ablated or ablated region 952*b* is formed that is over the substantially same area as the bridge portion 950*b* and may expose the (non-conductive) material of the plate substrate. The ablated region 952*b* may be substantially free of conductive material and may electrically isolate the terminal electrode 918*b* from a conductive portion of the contact plate along the upper surface (if any exists). In some cases, the ablated region 952*b* may extend partially into the plate substrate. The bridge portion 950*b* may also be removed using a mechanical cutter, etching solution or other material removal technique to define a machined region that corresponds to the ablated region 952*b* indicated on FIG. 9B.

Figure 10:
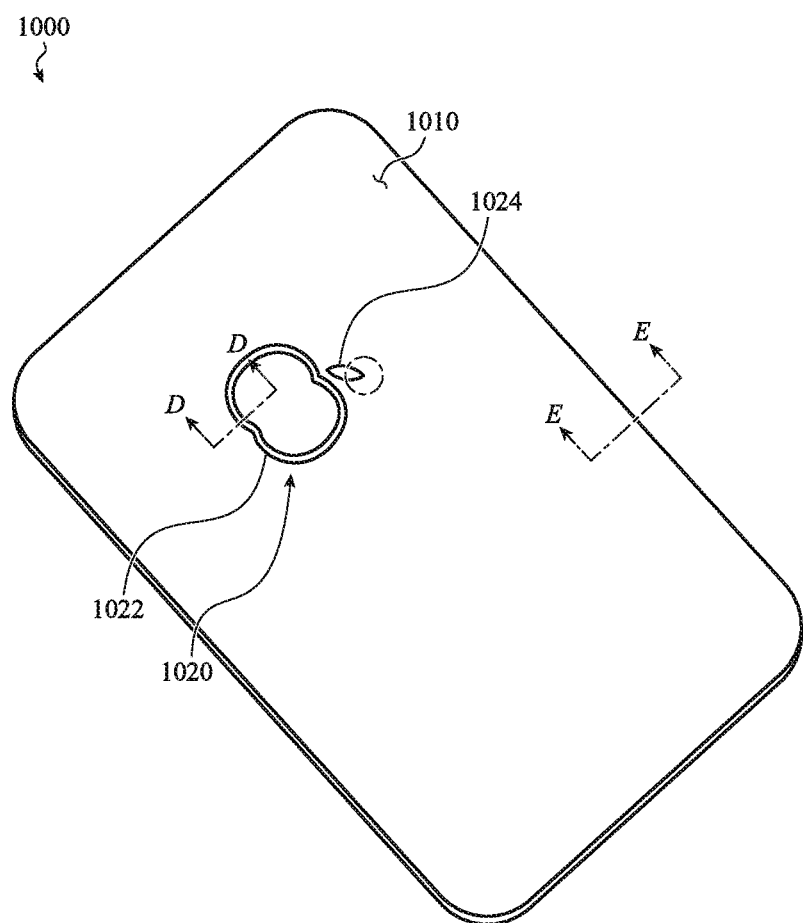
FIG. 10 depicts an example marking on an electronic card.

FIG. 10 depicts an example marking on an electronic card. In particular, FIG. 10 depicts a marking 1020 that includes a first laser-formed relief feature 1022 and a second laser-formed relief feature 1024 formed into the front surface 1010 of the electronic card 1000. As described in more detail below with respect to FIGS. 11A-15B, the laser-formed relief features 1022, 1024 ("relief features") may extend through a coating layer of the electronic card 1000 and, in some instances, may extend at least partially into the card substrate.

The marking 1020 may include one or more printed portions in addition to the relief features 1022, 1024. The printed portions may be formed by applying an ink, dye, or pigment to the front surface 1010 of the electronic card 1000. The marking 1020 may include a symbol like the logo depicted in FIG. 10. The marking 1020 may also include text or numerical information including, for example, a serial number, account number, user name, institution name, telephone numbers, addresses, and other text, numerical, or symbolic information.

FIGS. 11A-11E depict examples of cross-sectional views of example markings. The example markings depicted in FIGS. 11A-11E may correspond to one or more of the markings described above including, for example marking 1020 of FIG. 10 and markings 114 of FIG. 1A.

Figure 11A:
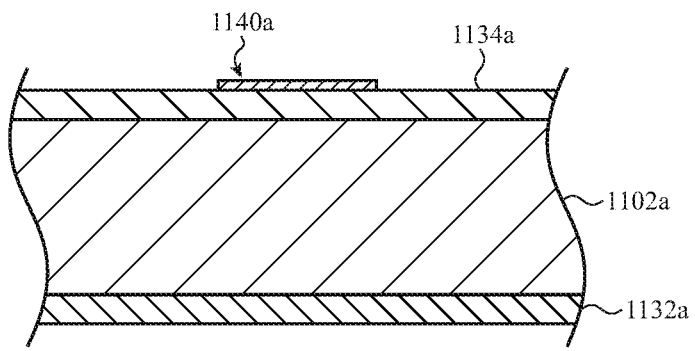
FIGS. 11A-11F depict cross-sectional views of an example marking on an electronic card.

FIG. 11A depicts an example marking 1140a formed along an exterior surface of a coating layer 1134a. In this example, the substrate 1102a is coated or at least partially covered on both sides by coating layers 1132a and 1134a. The coating layers 1132a and 1134c may be formed in accordance with other coating layers described herein, a redundant description of which is omitted for clarity. In the example of FIG. 11A, the marking 1140a includes a marking material that is deposited or otherwise disposed along the upper or exterior surface of the coating layer 1134a. The marking 1140a may include a printed ink, paint, or other material that is visually distinct from the surrounding portions of the coating layer 1134a. While marking 1140a is depicted in FIG. 11A as being exposed, the marking 1140a may be coated or at least partially covered by a protective film or coating, which may be translucent or transparent to allow visibility of the marking 1140a.

Figure 11B:
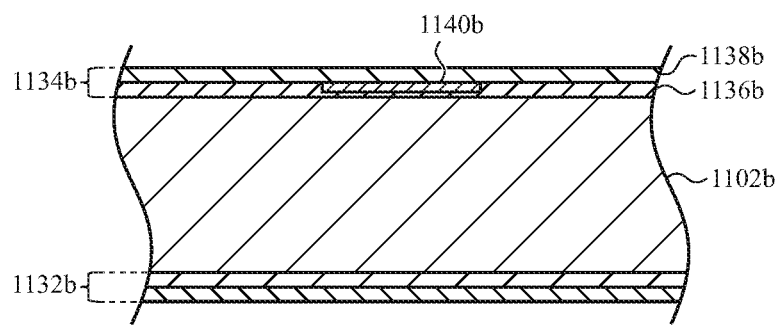

FIG. 11B depicts an example marking 1140b formed below an exterior surface of a coating layer 1134b. As shown in FIG. 11B, the marking 1140b may be a subsurface marking that is formed below the exterior surface of the coating layer 1134b but above a surface of the substrate 1102b. The marking 1140b may be formed using a laser beam that is focused into a subsurface region of the coating layer 1134b. The marking 1140b may be visible or viewable from the exterior surface but also substantially indelible or protected from wear or abrasion. The marking 1140b may also be applied after the electronic card has been formed and may include personalized information including, for example, an account number, account holder's name, account type, card issuer information, expiration date, CVC code, or other card-specific information.

In some instances, the coating layer 1134b is formed from multiple layers, similar to other embodiments described herein. In particular, the coating layer 1134b may include a first layer 1136b disposed over a surface of the substrate 1102b and that may include a primer and a color layer. The color layer and/or primer layer may include a pigment dispersed throughout a polymer or other type of binder similar to the other embodiment described herein. The coating layer 1134b may also include a second layer 1138b that is disposed over the first layer 1136b. The second layer 1138b may include a transparent or translucent material that has a hardness that is greater than the first layer 1136b. Similar to other examples described herein, the second layer 1138b may include an acrylate material, UV-curable polymer, DLC, or other similar type of coating. The coating layer 1132b may be formed of a similar or the same multi-layer construction as coating layer 1134b. Similar to previous examples, the coating layers 1132b, 1134b may be a single continuous layer or may be a discontinuous layer having a break along an edge or edges of the electronic card.

As shown in FIG. 11B, the marking 1140b may be formed below the second layer 1138b and at least partially into the first layer 1136b. In one example, the marking 1140b is formed by focusing a laser through the second layer 1138b and into the first layer 1136b to chemically and/or physically alter a region of the first layer 1136b. In some instances, the second layer 1138b is substantially unaltered or intact after forming the marking in the first layer 1136b. In some instances, the second layer 1138b has been affected, but only in an internal region and the exterior surface of the second layer 1138b remains substantially intact. By way of example, a UV laser having a wavelength between 10 and 400 nm having a power of less than 1 watt is used to form the marking 1140b. In some cases, a UV laser having a wavelength between 300 and 377 nm and a power of less than 0.5 watts is used to form the marking 1140. The UV laser may have a pulse width that ranges between 0.5 nanosecond to 40 nanoseconds. The UV laser may also have a frequency of approximately 225 kHz to 400 kHz.

With regard to FIG. 11B, in some embodiments, a laser may be used to form a dark or darkened region along the first layer 1136b by creating a series of laser-treated spots. Each spot may be created using a UV laser to disperse, ablate, or otherwise alter the pigment (e.g., a titanium oxide pigment) to alter the reflective light properties of the first layer 1136b. In some cases, the laser at least partially oxidizes the treated portion of the first layer 1136b. The laser-treated spots may have a diameter that ranges between 5 um and 60 um and are arranged in a pattern of approximately 5000 dots per inch to approximately 8000 dots per inch. In some cases, the spot density is approximately 6500 dots per inch to approximately 7500 dots per inch. In some cases, the pitch or spacing of the spots is different in different directions. For example, the pitch of the spots may be approximately 0.5 to 1.5 um in a first direction and approximately 5 um to 10 um in a second direction that is perpendicular to the first direction. The spots may be formed using back-and-forth multi-directional passes to define a "serpentine" or dual-direction raster laser treatment pattern or a series of single direction passes to define a "typewriter" or single-direction raster laser treatment pattern. In some cases, multiple passes of the laser are made over a given region to form the laser marking 1140b. In some cases, the laser marking 1140b has a feature size (e.g., a line width) that is determined by the spot side of the laser (e.g., between 5 um and 60 um). In some cases, the laser marking 1140b includes larger area features that are formed using an array of laser-treated spots while appearing substantially uniform to the naked eye when viewed from several inches away.

Figure 11C:
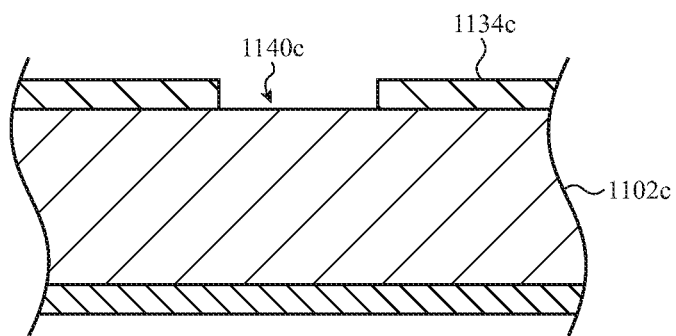

FIG. 11C depicts an example marking 1140c that is etched into the cover layer 1134c. In this example, the marking 1140c is formed by removing a portion of the cover layer 1134c to expose a portion of the substrate 1102c. The substrate 1102c may have a different color or visual appearance that may be visually distinct from the surrounding portions of the cover layer 1134c to provide the visual qualities of the marking 1140c. In some cases, the surface of the substrate 1102c is treated to provide a color that enhances the visual distinction or appearance of the marking 1140c. As described in more detail with respect to FIGS. 12-14, an exposed portion of a substrate may be polished and/or enhanced with an oxide coating to provide a marking that may be visually distinct.

In the example of FIG. 11C, the marking 1140c may be formed by removing a portion of the cover layer 1134c. In some cases, the cover layer 1134c may be exposed to a laser, which ablates or otherwise removes portions of the cover layer 1134c to expose the underlying substrate 1102c. In other cases, the respective portions of the cover layer 1134c may be removed using a chemical etching process, a mechanical etching process, or other material removal technique.

Figure 11D:
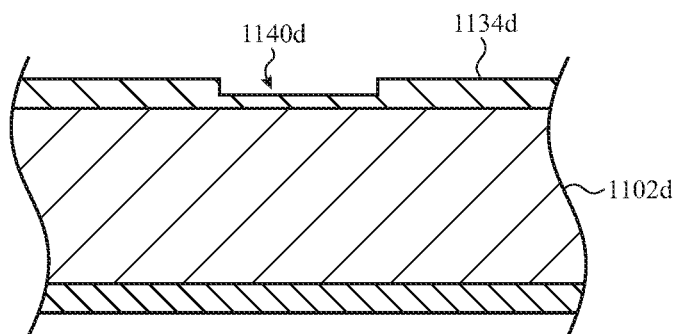

FIG. 11D depicts an example marking 1140d that is etched partially into the cover layer 1134d. As shown in FIG. 11D, the marking 1140d defines or is defined by a recess or groove that is formed into the cover layer 1134d but does not expose portions of the underlying substrate 1102d. In some implementations, the cover layer 1134d is formed from multiple layers, two or more of which have a different color or visual appearance. One or more top or outer layers may be removed to expose a lower or inner layer having a different color or visual appearance from the top or outer layers thereby forming a marking 1140d having a distinct visual appearance.

In the example of FIG. 11D, the marking 1140d may be formed by removing a portion of the cover layer 1134d. In some cases, the cover layer 1134d may be exposed to a laser, which ablates or otherwise removes portions of the cover layer 1134d to expose a lower or inner sublayer of the cover layer 1134d having a different color or distinct visual appearance. In other cases, the respective portions of the cover layer 1134d may be removed using a chemical etching process, a mechanical etching process, or other material removal technique.

Figure 11E:
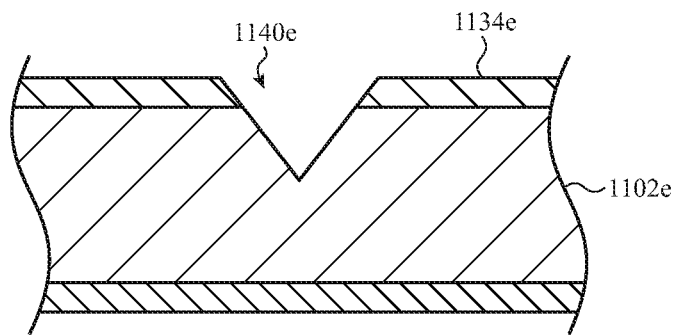

FIG. 11E depicts an example marking 1140e that is etched into the cover layer 1134e and a portion of the underlying substrate 1102e. As shown in FIG. 11E, the marking 1140e defines or is defined by a recess or groove that is formed into the cover layer 1134e and an outer or upper portion of the substrate 1102e. In the example of FIG. 11E, the recess or groove has a beveled or angled cross section. In particular, the recess of the marking 1140e includes two opposing angled sidewalls, which may provide the desired visual effect. The substrate 1102e may have a color or visual appearance that is visually distinct from the surrounding portions of the cover layer 1134e to provide the visual qualities of the marking 1140e. In some cases, the exposed portions of the substrate 1102e are treated to provide a color that enhances the visual distinction or appearance of the marking 1140e. As described in more detail with respect to FIGS. 12-14, an exposed portion of a substrate may be polished and/or enhanced with an oxide coating to provide a visually distinct marking.

In the example of FIG. 11E, the marking 1140e may be formed by removing a portion of the cover layer 1134e and substrate 1102e. In some cases, the cover layer 1134e and the substrate 1102e may be exposed to a laser, which ablates or otherwise removes portions of the cover layer 1134e and substrate 1102e to form a groove or recess. In other cases, the respective portions of the cover layer 1134e and the substrate 1102e may be removed using a chemical etching process, a mechanical etching process, or other material removal technique.

Figure 11F:
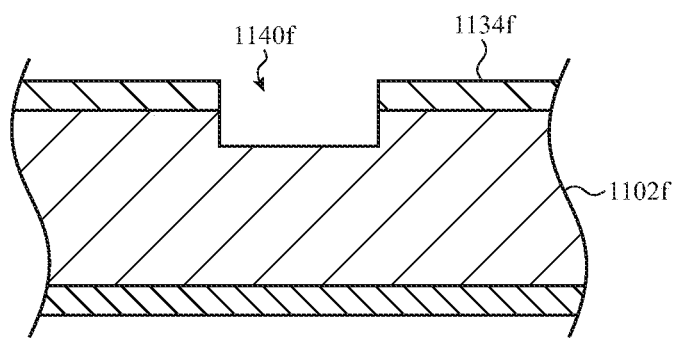

FIG. 11F depicts an example marking 1140f that is etched into the cover layer 1134f and a portion of the underlying substrate 1102f. As shown in FIG. 11F, the marking 1140f defines or is defined by a recess or groove that is formed into the cover layer 1134f and an outer portion of the substrate 1102f. In the example of FIG. 11F, the recess or groove has a rectangular cross section. The recess of the marking 1140f has a substantially flat bottom surface, which may provide the desired visual effect. Similar to previous examples, the substrate 1102f may have a different color or visual appearance that may be visually distinct or visually different from the surrounding portions of the cover layer 1134f to provide the visual qualities of the marking 1140f. Similar to other examples, one or more exposed surfaces of the substrate 1102f may be treated to provide a color that enhances the visual distinction or appearance of the marking 1140f. As described in more detail with respect to FIGS. 12-14, an exposed portion of a substrate may be polished and/or enhanced with an oxide coating to provide a marking that may be visually distinct.

In the example of FIG. 11F, the marking 1140f may be formed by removing a portion of the cover layer 1134f and substrate 1102f. In some cases, the cover layer 1134f and the substrate 1102f may be exposed to a laser, which ablates or otherwise removes portions of the cover layer 1134f and substrate 1102f to form a groove or recess. In other cases, the respective portions of the cover layer 1134f and the substrate 1102f may be removed using a chemical etching process, a mechanical etching process, or other material removal technique.

Figure 12:
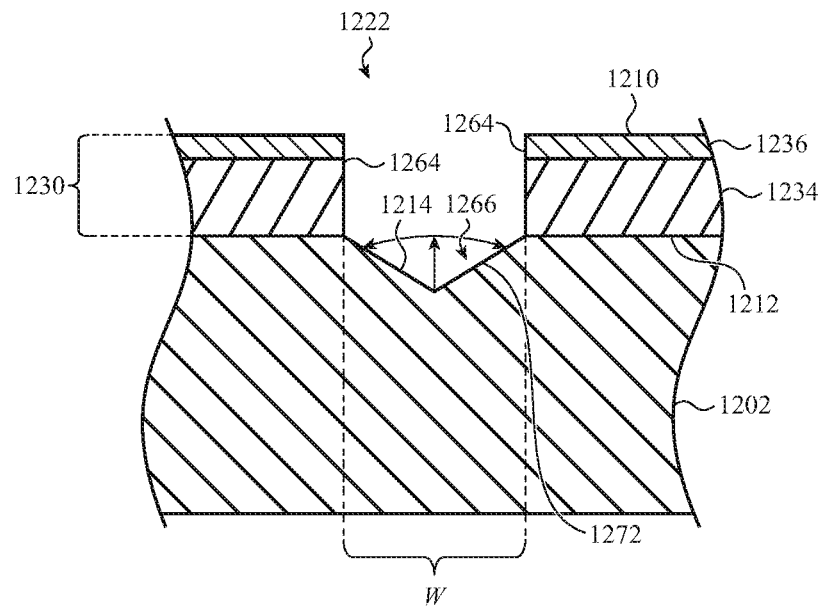
FIGS. 12, 13, and 14 depict example laser-formed relief features.
Figure 13:
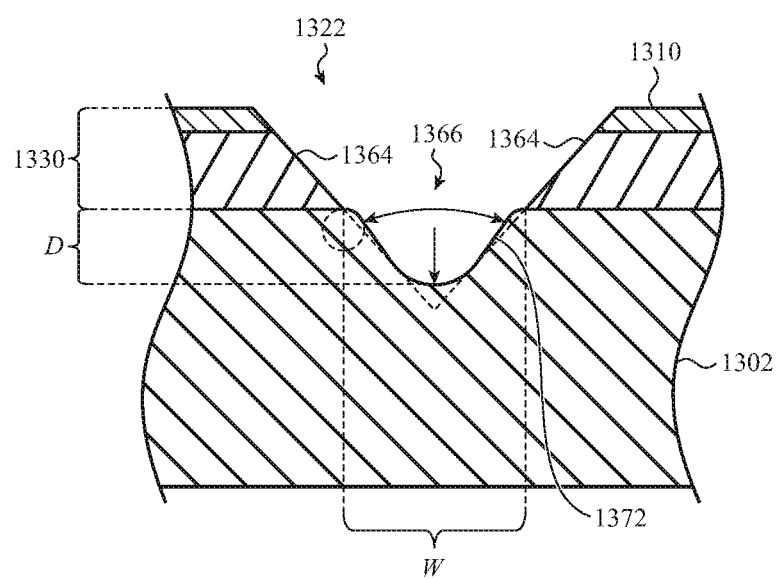
Figure 14:
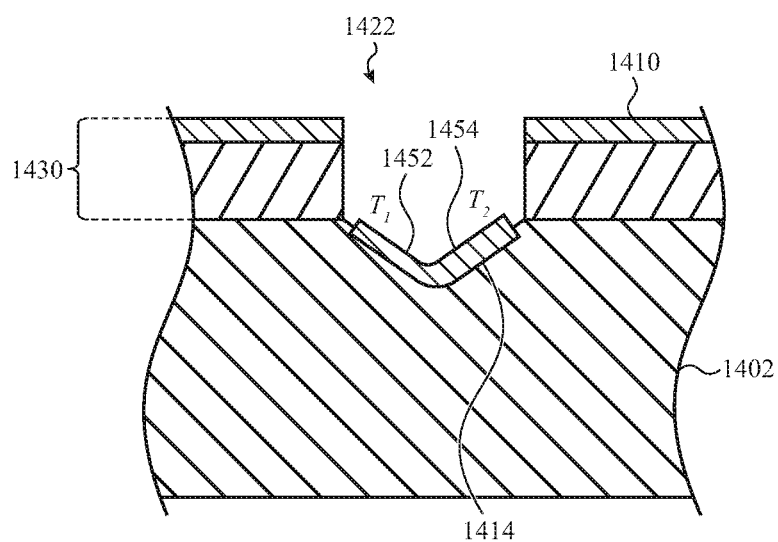

FIGS. 12-14 depict cross-sectional views of an example marking formed into the surface of an electronic card. In particular, FIG. 12 depicts a cross-sectional view of a relief feature 1222. The relief feature 1222 of FIG. 12 may correspond to the first laser-formed relief feature 1022 of FIG. 10. FIG. 12 provides an example of a fine or precision marking which can be produced using a laser-based technique. In the example of FIG. 12, a laser may be used to remove a portion of the coating layer 1230 and expose a portion of the substrate 1202, which may be formed from a metal material. As shown, removal of a portion of the coating layer 1230 may not significantly distort an adjacent portion of the coating layer 1230 or the underlying substrate 1202. While the exposed substrate 1202 is depicted as having an angled non-planar feature, in some implementations the exposed substrate 1202 may be substantially flat or planar. Further, a metal oxide layer may be formed on the exposed metal substrate 1202 as described below with respect to FIG. 14.

As shown in FIG. 12, the relief feature 1222 includes a pair of recess walls 1264 that define a recess extending through the coating layer 1230. The relief feature 1222 also includes a recessed marking feature 1266 that defines a bottom of the recess. The recessed marking feature 1266 may have a coating, texture, coloring, or appearance that causes the recessed marking feature 1266 to be visually distinct from an adjacent portion of the coating layer 1230. The recess defined by the pair of recess walls 1264 and the marking feature 1266 has a width W, which may be determined, in part, by a spot size diameter of a laser used to form the relief feature 1222. Note that while the pair of recess walls 1264 are depicted as forming an angle of approximately 90° with respect to the front surface 1210, the embodiments are not limited to this particular geometry. In other embodiments, one or both of the pair of recess walls 1264 may be formed at a (non-perpendicular) angle with respect to the front surface 1210.

As shown in FIG. 12, the coating layer 1230 is formed along the surface 1212 of substrate 1202 and the recessed marking feature 1266 is formed into the surface 1212 of the substrate 1202 to define marking surface 1214. The marking surface 1214 may be at the same height as the surface 1212 or, as shown in FIG. 12, may be at a different height as the surface 1212. In some embodiments, the marking surface 1214 is recessed by 5 µm or less, 3 µm or less, 2 µm or less, or 1 µm or less, with respect to the surface 1212.

In general, the marking surface 1214 may have a texture which gives the recessed marking feature 1266 a visual appearance that may be different or visually distinct from an adjacent portion of the coating layer 1230. For example, marking surface 1214 may have a surface finish with a roughness corresponding to that of a polished surface. The roughness of marking surface 1214 may be from about 1 µm to about 5 µm. In an additional example, the roughness of marking surface 1214 may be greater than 5 µm, or greater than 10 µm. One measure of surface roughness is the parameter $R_a$ which is a measure of the amplitude of the roughness profile (arithmetic average value of roughness determined from deviations about a center line). Another parameter is $S_m$, which is the mean spacing between peaks in the roughness profile. Reflectance may also be used as a measure of surface roughness.

In some implementations, the marking surface 1214 may include a dye, ink, or other marking element that may be used to provide a marking color for the recessed marking feature 1266. In some cases, the marking surface 1214 includes an oxide layer which may provide a marking color for the recessed marking feature 1266. The metal oxide may be a thermally grown metal oxide and may be thermally grown on a metal material by heating the substrate using a laser. Examples of an oxide layer formed within a relief feature are described below with respect to FIG. 14.

As shown in FIG. 12, the coating layer 1230 may be a multilayer coating. In the current example, the coating layer 1230 includes a first layer 1234 having a thickness $T_1$ and a second layer 1236 having a thickness $T_2$. The thickness of the first layer 1234 may be greater than that of the second layer 1236. In some embodiments, the combined thickness of the coating layers is from 50 µm to 500 µm or from 100 µm to 300 µm. The first layer 1234 is disposed over exterior surface 1212 of the substrate 1202 and, as shown in FIG. 12, may contact the surface 1212 along an interface between coating layer 1230 and the substrate 1202. The second layer 1236 is disposed over the first layer 1234.

The first layer 1234 may include one or more polymer materials. In one example, the first layer 1234 includes a first urethane layer (e.g., a primer layer) that is adhered to a surface of the substrate 1202. The first layer 1234 may include one or more additional urethane materials that are bonded or adhered to the substrate 1202 via the first urethane layer or primer layer. The one or more additional urethane materials may include a dual urethane or polyurethane formulation that is applied to the first urethane layer or primer layer.

In some embodiments, the first layer 1234 includes pigment particles dispersed within a polymer binder. As an example, the pigment particles may be inorganic pigment particles that include a metal oxide including, without limitation, titanium oxides ($TiO_2$, $Ti_2O_3$), zinc oxides (ZnO), manganese dioxides ($MnO_2$), and iron oxides ($Fe_3O_4$). The particles may have a size range of 0.1 µm to 10 µm or 0.1 µm to 1 µm. The first layer 1234 may further comprise other additives or constituent components.

In some embodiments, the second layer 1236 is transparent and may be formed from a transparent polymer. The transparent polymer of the second layer 1236 may have a hardness and/or an abrasion resistance greater than that of the first layer 1234. For example, the second layer 1236 may comprise an acrylate polymer (e.g., acrylic) or an epoxy polymer. In some cases, the coating layer 1236 includes a UV-curable polymer. In some cases, the second layer 1236 includes a diamond-like carbon (DLC) coating or other hard material that may be formed in a thin layer. The second layer 1236 may also comprise filler materials, including, for example, nanoscale inorganic or diamond materials. Nanoscale filler materials may have a diameter less than 100 nm or less than 50 nm.

The first layer 1234 and/or second layer 1236 may be deposited on the substrate 1202 using a deposition or layer application process including, for example, physical vapor deposition (PVD), atomic deposition coating (ALD), spray coating, dip coating, and other similar material deposition processes. In some cases, the first layer 1234 is applied to a primer layer that is formed on a surface of the substrate 1202. The foregoing discussion of the first and second layers 1234, 1236 is not limited to the example of FIG. 12, but applies more generally to multilayer coatings that are described with respect to other aspects of the present disclosure.

In the example of FIG. 12, the relief feature 1222 includes a recessed marking feature 1266 having a geometric feature 1272 that extends into the substrate 1202. As shown in FIG. 12, the geometric feature 1272 is a channel formed into the substrate 1202 and having an angular or v-shaped cross-sectional shape that may generally be referred to as a "channel" 1272. The channel 1272 may have a width about equal to the width W of the recessed marking feature 1266. In some cases, a width of the channel 1272 may be from about 80% to 100% of the width of the recessed marking feature 1266. The channel 1272 may have an angle θ that may be greater than about 45 degrees and less than 180 degrees or from about 60 degrees to about 120 degrees.

FIG. 13 depicts a cross-sectional view of another example laser-formed relief feature 1322. Relief feature 1322 of FIG. 13 may correspond to the relief feature 1022 of FIG. 10. As shown in FIG. 13, the relief feature 1322 includes a pair of recess walls 1364 that extend into the coating layer 1330 to at least partially define a recess. In this example, the pair of recess walls 1364 extend at a non-perpendicular angle with respect to the front surface 1310 of the electronic card. As shown in FIG. 13, the relief feature 1322 also includes a recessed marking feature 1366 that defines a bottom of the recess. In this example the recessed marking feature 1366 includes a geometric feature 1372 having a curved or contoured shape that extends into the substrate 1302 a depth D and having a width W. The geometric feature 1372 may be described as a channel having angled walls that extend from a rounded bottom or trough. The geometric feature 1372 may have an angle θ that may be greater than about 45 degrees and less than 180 degrees or from about 60 degrees to about 120 degrees. In some cases, the angled walls of the geometric feature 1372 correspond to the angle of the recess walls 1364.

FIG. 14 depicts another example laser-formed relief feature. The laser-formed relief feature 1422 may correspond to the relief feature 1022 described above with respect to FIG. 10. Similar to the examples described above, the relief feature 1422 is formed along an exterior surface 1410 and extends into the coating layer 1430 and at least partially into an underlying metal substrate 1402, which may be formed from a metal material. In this example, the relief feature 1422 includes a marking surface 1414 having one or more oxide layers that provide a different color, distinct color, or particular visual appearance for the relief features. Specifically, the relief feature 1422 includes a first oxide layer 1452 having a first thickness $T_1$ and a second oxide layer 1454 having a second thickness $T_2$ that is greater than the first thickness $T_1$.

The metal oxide layers 1452, 1454 may include a thermally grown metal oxide. For example, the metal oxide layers 1452, 1454 may be thermally grown on the marking surface 1414 of the metal substrate 1402 by heating the substrate 1402 using a laser or other focused heat or energy source. Suitable metal materials include, but are not limited to, titanium alloys, steels, or zirconium-based, titanium-based, or iron-based bulk solidifying alloy substrates. In some embodiments, the thermally grown metal oxide may have a porosity less than that of an anodically grown porous metal oxide. In embodiments, the metal oxide may comprise a titanium oxide, an iron oxide, a chromium oxide, a zirconium oxide or combinations thereof.

The thickness of a metal oxide layer can affect the color of the relief feature 1422 in several ways. For example, the metal oxide layers 1452, 1454 may display a color as a result of interference of light reflected from the metal oxide and the underlying metal substrate 1402. Typically, the interference color displayed depends upon the thickness of the metal oxide. A metal oxide having a thickness too great to display interference colors may appear dark. When the metal oxide is very thin (or is not present), the recessed marking feature may appear bright or metallic. A variety of colors may be obtained, including, but not limited to, blue, purple, pink, orange, yellow, gold, brown, and green. Suitable thicknesses of the metal oxide layer to achieve a color from light interference may depend on the composition and crystallinity of the metal oxide layer as well as the desired color to be achieved. As an example, a thickness of the metal oxide layer may be from 50 nm to 500 nm to obtain a color through interference of light.

As shown in FIG. 14, the first oxide layer 1452 has a first thickness $T_1$, which may result in a first color or appearance and the second oxide layer 1454 has a second thickness $T_2$ that is greater than the first thickness $T_1$ and may result in a second color or appearance that is different than the first color or appearance. The configuration of FIG. 14 may produce different visual effects. In some implementations, the relief feature 1422 of FIG. 14 may appear to have the first color or visual appearance when viewed from one angle and may appear to have the second color or visual appearance when viewed from another, different angle. In some implementations, the first color of the first oxide layer 1452 and the second color of the second oxide layer 1454 are combined to provide an apparent third color when viewed by the naked (unaided) eye at a normal or typical viewing distance.

Figure 15A:
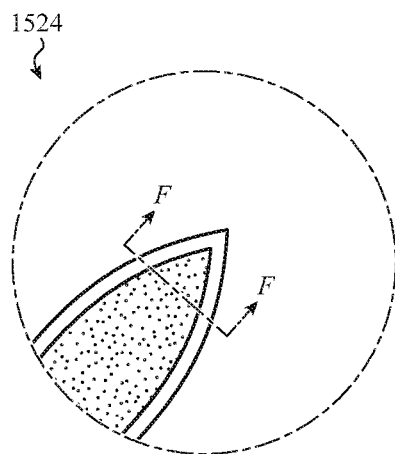
FIGS. 15A-15B depict example laser-formed relief features.
Figure 15B:
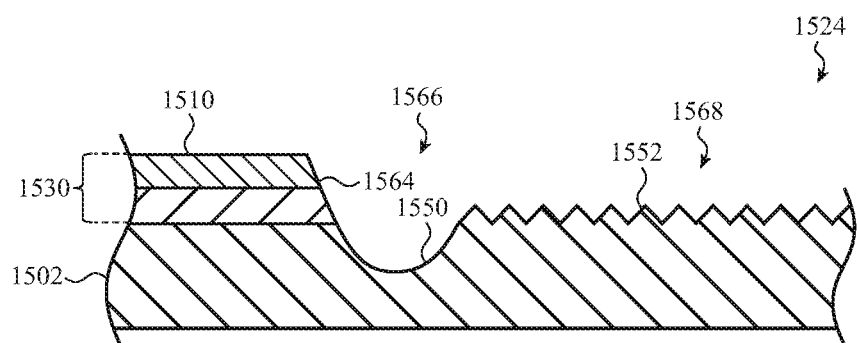

FIGS. 15A-15B depict other example laser-formed relief features. Specifically, FIG. 15A depicts an enlarged view of a relief feature 1524, which may correspond to relief feature 1024 of FIG. 10. FIG. 15B depicts a cross-sectional view of the relief feature 1524 along section F-F of FIG. 15A. The relief feature 1524 is provided as an example of how a relief feature 1524 may be formed over an area or region of the exterior surface of the electronic card. In general, the relief feature 1524 may be visually and tactilely distinct from surrounding or adjacent portions of the surface of the electronic card.

As shown in FIG. 15B, relief feature 1524 extends into the coating layer 1530 and at least partially into the substrate 1502, which may be formed from a metal material. The relief feature 1524 includes a recess wall 1564 that defines at least a portion of a recess. The relief feature 1524 also includes a first recessed marking feature 1566 that is formed around the periphery of the relief feature 1524. The first recessed marking feature 1566 may include a geometric feature, which, in this example, is a channel 1550 having a rounded or contoured shape and extending into the substrate 1502. The relief feature 1524 also includes a second recessed marking feature 1568 that is at least partially surrounded by the first recessed marking feature 1566.

The second recessed marking feature 1568 may cover a majority of the area of the relief feature 1524 and may provide the main appearance or visual characteristics of the relief feature. In this example, the second recessed marking feature 1568 includes a surface texture 1552, which may provide a distinct visual appearance as compared to surrounding or adjacent portions of the electronic card. In some implementations, the second recessed marking feature 1568 may also include one or more oxide layers that provide one or more colors for the relief feature 1524.

Figure 16A:
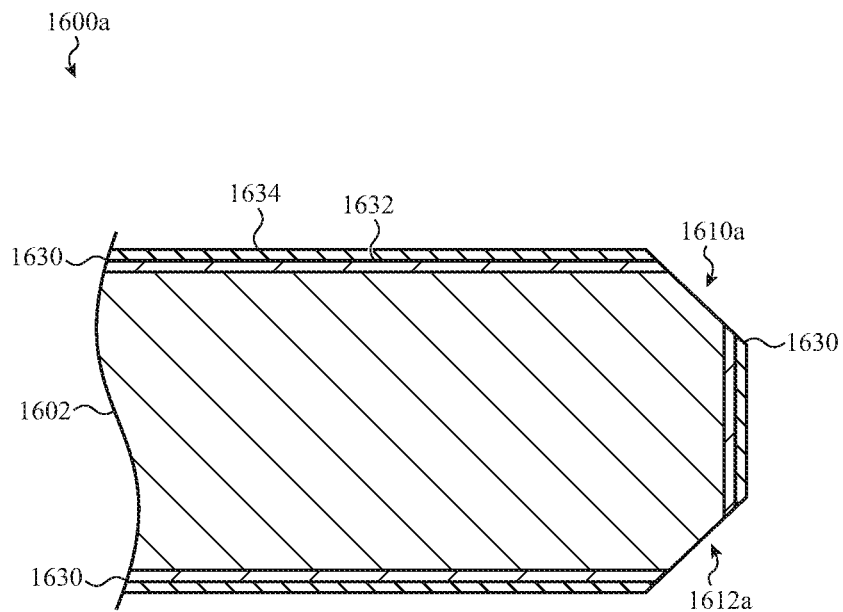
FIGS. 16A-16C depict example chamfers of an electronic card.
Figure 16B:
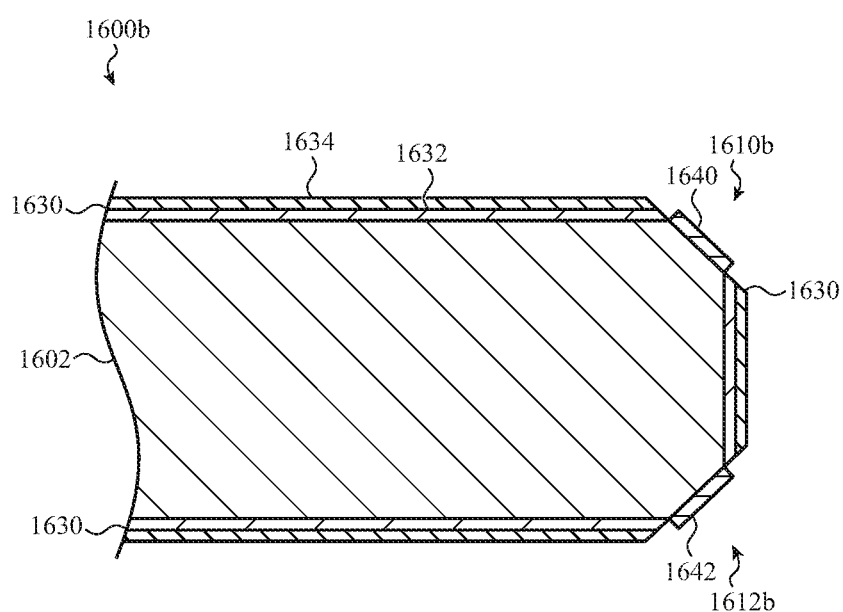
Figure 16C:
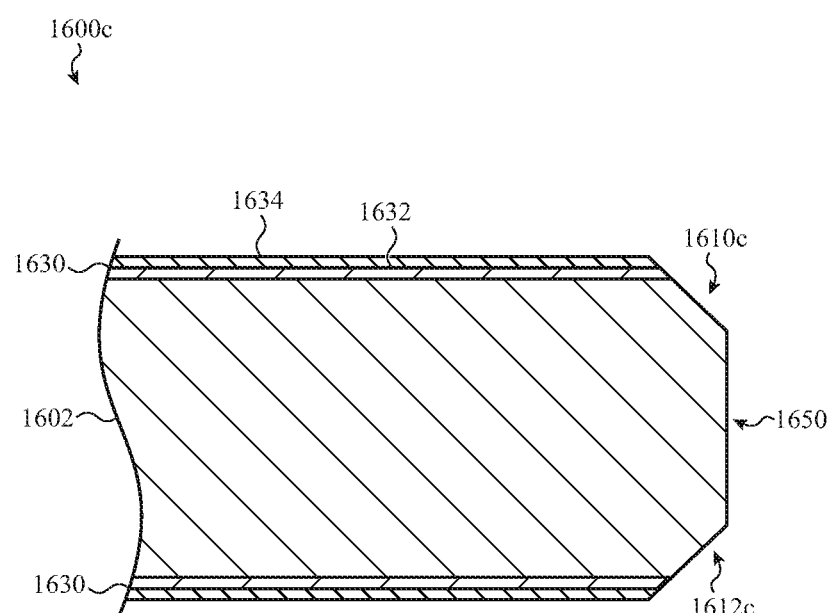

FIGS. 16A-16C depict example chamfers of an electronic card. The electronic cards 1600a, 1600b, 1600c, of FIGS. 16A, 16B, and 16C may correspond to or be similar to the electronic card 100 described above with respect to other figures. As described previously, chamfers may provide various functional and/or visual benefits for an electronic card. For example, chamfered edges or chamfers may facilitate insertion of the card into a card reader or card-reading device. The chamfered edges or chamfers may also provide a desired tactile feel or make the electronic card easier to handle. Additionally, the chamfered edges or chamfers may provide a distinct visual appearance.

FIG. 16A depicts a cross-sectional view of chamfered edges 1610a, 1612a of the electronic card 1600a having exposed portions (chamfer portions) of a card substrate 1602. Similar to other embodiments described herein, the electronic card 1600a includes a substrate 1602 that may be formed from a metal or metallic material. The electronic card 1600a also includes a coating layer 1630 that may include multiple layers. As shown in FIG. 16A, the coating layer 1630 includes a first layer 1632, which may be used to provide a color or appearance for the electronic card 1600a. As described previously, the first layer 1632 may include a pigment or dye that is dispersed within a polymer or polymer binder. The coating layer 1630 also includes a second layer 1634 that may be formed from a hard and/or transparent material and is positioned over the first layer 1632. As described previously, the second layer 1634 may include a transparent polymer including, for example, an acrylic (e.g., acrylate polymer) or an epoxy (e.g., epoxy polymer). In some cases, the coating layer 1632 includes a UV-curable polymer. In some cases, the second layer 1634 includes a hard coating, such as a diamond-like carbon (DLC) coating.

As shown in FIG. 16A, the electronic card 1600a includes front chamfered edge 1610a and rear chamfered edge 1612a. The front chamfered edge 1610a may extend around or surround the front surface of the electronic card 1600a and the rear chamfered edge 1612a may extend around or surround the rear surface of the electronic card 1600a. In this example, the chamfered edges 1610a, 1612a include an exposed portion of the substrate 1602, also referred to herein as a chamfer portion of the substrate 1602. In some cases, the exposed or chamfer portion of the substrate 1602 is polished or is otherwise treated to provide a smooth surface finish. In some cases, the exposed or chamfer portions are brushed or etched to provide a textured surface finish.

The chamfer portion of the substrate 1602 partially defining the chamfered edges 1610a, 1612a may have a visual appearance that is distinct from non-chamfered portions of the electronic card 1600a. In some implementations, the exposed or chamfer portions of the substrate 1602 along the chamfered edges 1610a, 1612a may have the natural color of the metal material that forms the substrate 1602. In other implementations, the exposed or chamfer portions of the substrate 1602 along the chamfered edges 1610a, 1612a may be anodized or oxidized to form an anodized or oxidized layer. The anodized or oxidized layer may have a natural color or may include a dye or pigment to provide a desired appearance or color.

As shown in FIG. 16A, the electronic card 1600a also defines a sidewall or substrate edge that extends between the front chamfered edge 1610a and the rear chamfered edge 1612a. In the embodiment depicted in FIG. 16A, the sidewall or substrate edge is coated with the same or similar coating layer 1630 as on the front and rear surfaces of the electronic card 1600a.

FIG. 16B depicts another example electronic card 1600b having chamfered edges 1610b, 1612b with exposed or chamfer portions of the substrate 1602 that are coated with oxide layers 1640, 1642. Similar to as described above with respect to FIG. 14, the oxide layers 1640, 1642 may be thermally grown oxides that are formed to a specific thickness in order to provide the desired color or appearance.

For example, the oxide layers 1640, 1642 may display a color as a result of interference of light reflected from the metal oxide and the underlying metal substrate 1602. As described previously, a metal oxide having a thickness too great to display interference colors may appear dark. When the metal oxide is very thin (or is not present), the recessed marking feature may appear bright or metallic. A variety of colors may be obtained, including, but not limited to, blue, purple, pink, orange, yellow, gold, brown, and green. Suitable thicknesses of the oxide layers 1640, 1642 to achieve a color from light interference may depend on the composition and crystallinity of the layer as well as the desired color to be achieved. As an example, a thickness of the oxide layers 1640, 1642 may be from 50 nm to 500 nm to obtain a color through interference of light. In some implementations, the substrate 1602 is both anodized and coated with the oxide layers 1640, 1642 to provide a particular color or visual effect.

Similar to the other examples described above, the electronic card 1600b of FIG. 16B may include a coating layer 1630 that provides a visual appearance or color for the electronic card 1600b. Similar to the previous examples, the coating layer 1630 may include multiple layers including sublayers 1632 and 1634. The appearance of the coating layer 1630 may be distinct from and/or may contrast with the color or appearance of the chamfers 1610b, 1612b having oxide layers 1640, 1642. As shown in FIG. 16B, the electronic card 1600a also defines a sidewall or substrate edge that extends between the front chamfered edge 1610a and the rear chamfered edge 1612a. In the embodiment depicted in FIG. 16A, the sidewall or substrate edge is coated with the same or similar coating layers 1630 as on the front and rear surfaces of the electronic card 1600a.

FIG. 16C depicts another example electronic card 1600c having chamfered edges 1610c, 1612c with exposed or chamfer portions of the substrate 1602. In the example of FIG. 16C, the substrate 1602 also defines an exposed sidewall or substrate edge 1650. In some cases, the exposed sidewall or substrate edge 1650 is coated with a thin and/or transparent coating that protects the substrate 1602 but allows the natural color of the substrate 1602 to be visible along the edge of the electronic card 1600c. Similar to the other examples described above, the electronic card 1600c may include a coating layer 1630 that provides a visual appearance or color for the electronic card 1600c. Similar to the previous examples, the coating layer 1630 may include multiple layers including sublayers 1632 and 1634. The appearance of the coating layer 1630 may be distinct from and/or may contrast with the color or appearance of the chamfers 1610c, 1612c, and/or the exposed sidewall 1650.

Figure 17:
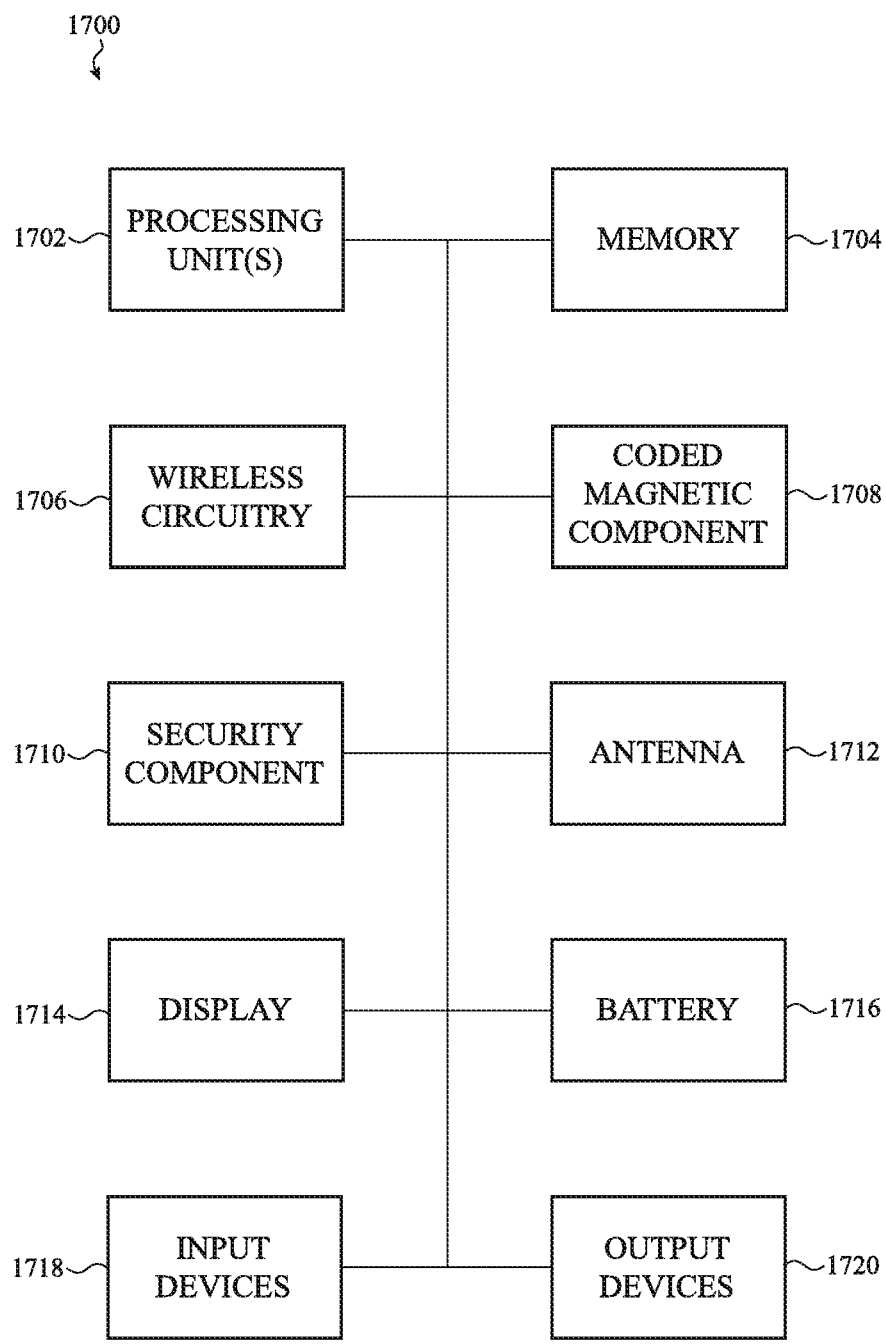
FIG. 17 depicts example components of an electronic card.

FIG. 17 depicts example components of an electronic card 1700. The electronic card 1700 may correspond to any one of the electronic card embodiments described herein. Specifically, the electronic cards described herein may include one or more components described below with respect to electronic card 1700. However, the schematic diagram of FIG. 17 is not intended to be an exhaustive or comprehensive description of the components or elements of an electronic card. Further, one or more of the components or elements described below may be optional or omitted from any particular implementation.

In accordance with some embodiments, the electronic card 1700 may be foldable or bendable. For example, the electronic card 1700 may define one or more foldable regions or bendable regions that are configured to fold or flex repeatedly during use. The various components described herein may be adapted to facilitate a foldable card including, for example, flexible electronic components, flexible battery elements, flexible display elements, and the like.

As shown in FIG. 17, the electronic card 1700 includes one or more processing unit(s) 1702. The processing unit(s) 1702 may include one or more computer processors or microcontrollers that are configured to perform various operations or functions. In some cases the processing unit(s) 1702 perform the various operations in response to computer-readable instructions or firmware. The processing unit(s) 1702 may include a central processing unit (CPU), numerical processing unit (NPU), and other processing circuitry. The processing unit(s) 1702 may include other processors within the electronic card 1700 including application specific integrated chips (ASIC) and other microcontroller devices.

In addition, the processing unit(s) 1702 may be operatively connected to memory 1704. The processing unit(s) 1702 may be operatively connected to the memory 1704 via an electronic bus or bridge. In some cases, the processing unit(s) 1702 may be directly coupled to the memory 1704. The memory 1704 may include a variety of types of non-transitory computer-readable storage media, including, for example, read access memory (RAM), read-only memory (ROM), erasable programmable memory (e.g., EPROM and EEPROM), or flash memory. The memory 1704 is configured to store computer-readable instructions, encoded security keys, security codes, serial numbers, identifying information, financial information, medical information, or other types of data or records.

As shown in FIG. 17, the electronic card 1700 may also include wireless circuitry 1706. As discussed previously, the electronic card 1700 may include a wireless transceiver or other wireless electronics that are configured to interface with an external device using a wireless communication protocol. In some implementations, if the electronic card 1700 interfaces with external devices using primarily wireless circuitry 1706, the electronic card 1700 may be referred to as a contactless card. It is not necessary that a contactless card not include physical contacts or terminals. Additionally, if the electronic card 1700 is a contact card, the electronic card 1700 may not include wireless circuitry.

The electronic card 1700 may include a coded magnetic component 1708. As described above with respect to some embodiments, the electronic card 1700 may include a magnetic element (e.g., a ferromagnetic film) that defines a magnetic region or area along a surface of the electronic card 1700. The coded magnetic component 1708 may store encoded information or data and allow the information or data to be read using an external card reader or card-reading device. The coded magnetic component 1708 may be configured to enable dynamic encoding that can be changed depending on the usage of the electronic card 1700. For example, information stored on the coded magnetic component 1708 may be changed by the processing unit 1702 and/or an external encoder in response to a particular use case or operation performed using the electronic card 1700. The information stored may include an account balance, amount of value, authorization code, or other type of dynamic information.

As shown in FIG. 17, the electronic card 1700 may include a security component 1710, which may be used to authenticate the electronic card 1700. In general, the security component 1710 includes an element or feature that is or would be difficult to copy or counterfeit. In some cases, the security component 1710 may include a sticker or visual marking having at least one feature that is difficult to copy or replicate. For example, the security component 1710 may include a sticker or marking having a holographic image, which is typically difficult to copy or replicate without sophisticated equipment. In some cases, the security component 1710 includes an embedded electronic code, electronic signature, or other electrically detectable element that is used to authenticate or identify the electronic card 1700. In general, the security component 1710 may be used to help determine that the electronic card 1700 is authentic or not a counterfeit. In some cases, an external reader is configured to read or detect the security component 1710 and provide access to a restricted area, restricted region, or restricted system upon presentation of the electronic card 1700.

The electronic card 1700 may include an antenna 1712. The antenna 1712 may work in conjunction with the wireless circuitry 1706 to facilitate wireless communications with an external device or reader. In some cases, the antenna 1712 is passive and is used to communicate a serial number or other unique identifier to an external device or reader. In some cases, the antenna 1712 may include or is configured as a radio-frequency identification (RFID) antenna, Bluetooth antenna, near-field communication (NFC) antenna, ultra-wideband antenna, or other similar component or device.

In some embodiments, the antenna 1712 is configured to receive and/or transmit signals with multiple external devices in order to determine a location of the electronic card 1700. For example, the antenna 1712 may be used to transmit a beacon signal that is detected by one or more external devices. Variations in the received signals from the various devices may be used to triangulate or calculate an estimated location of the electronic card 1700. In another example, the antenna 1712 of the electronic card 1700 is a broadband antenna (e.g., an ultra-wideband antenna) that is configured to detect a range of signals emitted from a variety of devices. The electronic card 1700 may use the detected signals to estimate a current location.

The antenna 1712 may also include a NFC antenna that can be used to conduct transactions with a point of sale (POS) device or other external device. In some implementations, the antenna 1712 may be configured to communicate with an antenna from another electronic card in order to authenticate or initiate a transaction between two parties. In one example, the electronic card 1700 is configured to exchange cash or card value when touched to or tapped against another similarly configured electronic card. The value exchange may be facilitated through a user interface that is displayed on the electronic card 1700 (using, for example, the display 1714) or that is displayed on another user device including, for example, a mobile phone, tablet, computer, or other device.

The antenna 1712 may also be used to transmit alerts or notifications to a user device. In one example, the antenna 1712 is configured to transmit a signal that is received or relayed to a user device when the user device moves out of a certain proximity of the electronic card 1700. This functionality may be useful to prevent the electronic card 1700 from being left in a business or other location unintentionally. The antenna 1712 may also be configured to receive instructions from a user device. For example, the antenna 1712 may be configured to receive a signal or relayed signal from a user device including instructions to disable the electronic card 1700. The instructions to disable the electronic card 1700 may come from another system or device that may be operated by the card issuer or other party.

In some implementations, the electronic card 1700 is shipped to the user or the customer in a container or package. The container or package may be configured for shipment through the mail or other delivery service. The container or package may also be configured for display in a retail store or setting. In some cases, the container or package is not configured for shipment without being placed into a separate shipping container or package. For example, the exterior of the container or package may have a cosmetic appearance that would not be able to withstand normal shipping conditions intact or free of defects.

In some implementations, the container or package may include an antenna or electronic component that is able to be read by the user's mobile phone or other personal electronic device (e.g., tablet, notebook computer, desktop computer, personal media player). For example, the container or package may include an envelope or pocket that the electronic card 1700 may be placed at least partially within. The envelope or pocket may include a sleeve that fully encloses the electronic card 1700 or may include a recess that partially encloses the electronic card 1700 and leaves a top (or bottom) surface substantially exposed. The package may also include one or more flaps or panels that are configured to fold over the envelope or pocket to conceal or cover the electronic card 1700 contained therein.

The container may also include one or more antennas that extend along one or more sides of the envelope or pocket. The one or more antennas may include a near-field communication (NFC) antenna, a radio-frequency identification (RFID) antenna, or other type of antenna configured for wireless communication. In one example, the container includes two elongated antennas that are located along opposite sides of the envelope or pocket. The two elongated antennas may be offset in an outward direction from the edges of the electronic card 1700 when the electronic card 1700 is positioned in the envelope or pocket of the container. In some cases, one or more antennas encircle or at least partially surround the electronic card 1700 when the electronic card 1700 is held within the container. In some cases, the antennas overlap with one or more portions of the electronic card 1700 when the electronic card 1700 is positioned in the envelope or pocket of the container.

In some implementations, the user's personal electronic device is able to identify the electronic card 1700 and obtain a serial number or another type of unique identifier. The user's personal electronic device may obtain the identity of the electronic card 1700 by electrically communicating with the one or more antennas integrated with the packaging. The user's personal electronic device may also be configured to communicate to an external device and/or service in order to register the electronic card 1700 with a registry or user account. In some cases, the electronic card 1700 is activated in response to the registration using the user's personal electronic device.

In some embodiments, the electronic card 1700 includes one or more visual output devices configured to provide output to a user. For example, the electronic card 1700 may include a display 1714 that renders visual information generated by the processing units 1702 or other form of graphical output. The display 1714 may include a liquid-crystal display (LCD), light-emitting diode, organic light-emitting diode (OLED) display, an active layer organic light emitting diode (AMOLED) display, organic electroluminescent (EL) display, electrophoretic ink display, or the like. If the display 1714 is a liquid-crystal display or an electrophoretic ink display, the display may also include a backlight component that can be controlled to provide variable levels of display brightness. If the display 1714 is an organic light-emitting diode or organic electroluminescent type display, the brightness of the display 1714 may be controlled by modifying the electrical signals that are provided to display elements. The display 1714 may be a foldable or flexible display that is configured to be bended or folded during normal operation.

In some implementations, the display 1714 is used to provide a dynamic or configurable marking for the electronic card 1700. For example, the display 1714 may be used to display the card holder's name, account number, card issuer logo, or other similar type of marking. In some implementations, the display 1714 may dynamically change the marking depending on the state or mode of the electronic card 1700. The display 1714 may display an indicia or other marking indicating that value has been loaded onto the electronic card 1700 and/or that the electronic card 1700 is authorized to conduct a transaction or transfer of money. In some embodiments, the display 1714 may alter the orientation of the marking or graphical output depending on the orientation of the electronic card 1700.

As shown in FIG. 17, the electronic card 1700 may also include a battery 1716 that is configured to provide electrical power to the components of the electronic card 1700. The battery 1716 may include one or more power storage cells that are linked together to provide an internal supply of electrical power. The battery 1716 may be operatively coupled to power management circuitry that is configured to provide appropriate voltage and power levels for individual components or groups of components within the electronic card 1700. The battery 1716, via power management circuitry, may be configured to receive power from an external source, such as an external wireless charger. In one example, the battery 1716 is operably coupled to a receive coil that is configured to receive wireless or inductively coupled power from a wireless charging device having a transmit coil. The battery 1716 may store received power so that the electronic card 1700 may operate without connection to an external power source for an extended period of time, which may range from several hours to several days. The battery 1716 may be flexible to accommodate bending or flexing of the electronic card 1700. For example, the battery 1716 may be mounted to a flexible structure or may be mounted to a flexible printed circuit. In some cases, the battery 1716 is formed from flexible anodes and flexible cathode layers and the battery cell is itself flexible. In some cases, individual battery cells are not flexible, but are attached to a flexible substrate or carrier that allows an array of battery cells to bend or fold around a foldable region of the electronic card 1700.

In some embodiments, the electronic card 1700 includes one or more input devices 1718. The input device 1718 is a device that is configured to receive input from a user or the environment. The input device 1718 may include, for example, a touch sensor, a force sensor, or another touch-activated sensor. The touch-activated sensor may be used to define a touch-activated button, gesture input region, capacitive slide bar, or other touch-sensitive region on the electronic card 1700. The input device 1718 may be configured to receive gesture input, force input, or a variety of other forms of touch input. In some embodiments, the input device 1718 may provide a dedicated or primary function, including, for example, a power button, home buttons, or other dedicated function or operation.

As shown in FIG. 17, the electronic card 1700 may include one or more output devices 1720. For example, the electronic card 1700 may include an output device 1720 that is configured to function as a speaker to produce sounds or an audio output. In another example the output device 1720 may be configured to operate as a tactile or haptic output device and produce a haptic output along a surface of the electronic card 1700. The output device 1720 may be formed from a mesh or matrix of fibers or wires that are configured to move or deform in response to a signal from the processing unit 1702. The movement of the mesh or matrix of fibers may produce the tactile or haptic output along the external surface of the electronic card 1700. Similarly, the movement of the mesh or matrix of fibers may produce a sound or audio output.

In some embodiments, the electronic card 1700 includes one or more devices that are configured to authenticate a user. For example, the electronic card 1700 may include a bio-sensor that is configured to identify or authenticate a user by detecting some unique bio-characteristic including, for example, a fingerprint, a facial pattern, an eye detection, or other bio-data. The bio-sensor may, for example, include a capacitive array that is configured to detect unique features of a user's fingerprint or touch. The bio-sensor may, alternatively, include an optical sensor that is configured to detect other unique characteristics of the user. The bio-sensor may be used to authenticate a financial transaction, provide access to a restricted area, and/or unlock a device or system paired to the electronic card 1700.

The following discussion applies to the electronic cards and electronic devices described herein to the extent that these cards or devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

What is claimed is:

1. An electronic identification card comprising:
a metal substrate having a first surface and a second surface and defining a recess extending into the first surface;
a ferromagnetic film disposed along the second surface of the metal substrate;
an integrated circuit disposed at least partially within the recess; and
a coating layer disposed over the metal substrate and comprising:
a first layer that extends over the first surface of the metal substrate and comprising a polymer and a pigment dispersed within the polymer; and
a second layer that extends over the first layer and comprises a transparent polymer, the second layer:
having a hardness that is greater than the first layer;
defining an exterior surface of the electronic identification card; and
having a surface roughness in a range from 0.3 μm to 1.0 μm.

2. The electronic identification card of claim 1, wherein:
the first layer comprises a urethane primer that is adhered to the first surface of the metal substrate;
the polymer of the first layer comprises a urethane that is adhered to the metal substrate by the urethane primer; and
the second layer comprises a transparent acrylate that defines a portion of an exterior surface of the electronic identification card.

3. The electronic identification card of claim 2, wherein:
the electronic identification card further comprises a contact plate positioned over the integrated circuit;
the portion of the exterior surface defined by the transparent acrylate is a first portion; and
the contact plate defines an array of terminal electrodes that define a second portion of the exterior surface of the electronic identification card.

4. The electronic identification card of claim 3, wherein each terminal electrode of the array of terminal electrodes is offset from an edge of the contact plate.

5. The electronic identification card of claim 3, wherein the contact plate further comprises a conductive layer that surrounds the array of terminal electrodes.

6. The electronic identification card of claim 3, wherein:
the contact plate comprises a plate substrate formed from a dielectric material; and
each terminal electrode comprises:
a first layer formed from an electroless-plated metal and extending over the dielectric material of the contact plate; and
a second layer formed from an electroplated metal and extending over the first layer.

7. The electronic identification card of claim 1, wherein:
the electronic identification card defines a first set of chamfered edges that surrounds the first surface; and
the electronic identification card defines a second set of chamfered edges that surrounds the second surface.

8. The electronic identification card of claim 7, wherein:
the ferromagnetic film is attached to a backing layer;
a first chamfered edge is defined, at least in part, by a beveled edge formed within the ferromagnetic film and the backing layer; and
the first chamfered edge is congruent with the beveled edge of the ferromagnetic film and the backing layer.

9. The electronic identification card of claim 1, wherein:
the electronic identification card further comprises a laser-formed relief feature comprising:
at least one recess wall defining a marking recess extending through the coating layer; and
a recessed marking feature defining a bottom of the marking recess.

10. The electronic identification card of claim 1, wherein:
the electronic identification card has a rectangular shape with four corners, each corner having a contoured shape; and
the contoured shape is a spline shape having a non-uniform radius of curvature.

11. The electronic identification card of claim 1, wherein:
the second surface of the metal substrate defines a stepped region;
the ferromagnetic film is positioned with the stepped region; and
the stepped region extends to an outer edge of the metal substrate.

12. An electronic card comprising:
a metal substrate defining a recess formed into a front surface;
a ferromagnetic film positioned along a rear surface of the metal substrate that is opposite to the front surface;
an integrated circuit positioned in the recess of the metal substrate; and
a contact plate positioned over the integrated circuit and comprising:
a plate substrate;
an array of terminal electrodes disposed over the plate substrate, each terminal electrode of the array of terminal electrodes offset from an edge of the plate substrate; and
a periphery portion that includes a conductive material that surrounds the array of terminal electrodes, the periphery portion separated from the array of terminal electrodes by one or more ablated regions.

13. The electronic card of claim 12, wherein:
the array of terminal electrodes are disposed over a front surface of the plate substrate;
the contact plate further comprises a rear conductive layer disposed over a rear surface of the plate substrate; and
the array of terminal electrodes are electrically coupled to the rear conductive layer by one or more vias that extend through the plate substrate.

14. The electronic card of claim 12, wherein:
the plate substrate is formed from a non-conductive material; and
the array of terminal electrodes comprise:
   a first conductive layer including an electroless-plated metal disposed over the non-conductive material of the plate substrate; and
   a second conductive layer including an electroplated metal disposed over the first conductive layer.

15. The electronic card of claim 12, wherein the terminal electrodes and the periphery portion are formed of a same material.

16. An electronic identification card comprising:
a metal substrate having a first surface and a second surface and defining a recess extending into the first surface;
a ferromagnetic film attached to a backing layer and disposed along the second surface of the metal substrate;
an integrated circuit disposed at least partially within the recess; and
a coating layer disposed over the metal substrate and comprising:
   a first layer that extends over the first surface of the metal substrate and comprising a polymer and a pigment dispersed within the polymer; and
   a second layer that extends over the first layer and comprises a transparent polymer;
the electronic identification card defining:
   a first set of chamfered edges that surrounds the first surface, the first set of chamfered edges including a beveled edge formed within the ferromagnetic film and the backing layer; and
   a second set of chamfered edges that surrounds the second surface.

17. The electronic identification card of claim 16, wherein:
the second layer has a hardness that is greater than the first layer;
the second layer defines an exterior surface of the electronic identification card; and
the second layer has a surface roughness in a range from 0.3 μm to 1.0 μm.

18. The electronic identification card of claim 16, wherein:
the coating layer is a first coating layer; and
the electronic identification card further defines a second coating layer disposed over the second surface of the metal substrate.

19. The electronic identification card of claim 18, wherein:
the beveled edge is a first beveled edge; and
the second set of chamfered edges includes a second beveled edge formed within the metal substrate and the second coating layer.

20. The electronic identification card of claim 19, wherein the beveled edge of the metal substrate defines an exposed surface of the electronic identification card.

* * * * *